(12) United States Patent
Yamagata et al.

(10) Patent No.: US 7,929,401 B2
(45) Date of Patent: Apr. 19, 2011

(54) OBJECTIVE LENS AND OPTICAL INFORMATION RECORDING/REPRODUCING APPARATUS HAVING THE SAME

(75) Inventors: Naoki Yamagata, Tokyo (JP); Shuichi Takeuchi, Saitama (JP)

(73) Assignee: Hoya Corporation, Tokyo (JP)

( * ) Notice: Subject to any disclaimer, the term of this patent is extended or adjusted under 35 U.S.C. 154(b) by 88 days.

(21) Appl. No.: 12/508,101

(22) Filed: Jul. 23, 2009

(65) Prior Publication Data

US 2010/0020672 A1  Jan. 28, 2010

(30) Foreign Application Priority Data

Jul. 24, 2008  (JP) .................................. 2008-190821

(51) Int. Cl.
*G11B 7/00* (2006.01)
(52) U.S. Cl. .............................. 369/112.23; 369/112.26
(58) Field of Classification Search .................. None
See application file for complete search history.

(56) References Cited

U.S. PATENT DOCUMENTS

| | | | |
|---|---|---|---|
| 6,819,504 B2 | 11/2004 | Maruyama | |
| 7,110,344 B2 | 9/2006 | Kimura | |
| 2007/0286054 A1 | 12/2007 | Koizumi et al. | |
| 2007/0297314 A1 | 12/2007 | Koreeda et al. | |
| 2008/0106998 A1* | 5/2008 | Ito ............................ | 369/112.24 |
| 2008/0165436 A1 | 7/2008 | Koreeda et al. | |
| 2009/0154325 A1 | 6/2009 | Inoue et al. | |
| 2009/0252021 A1 | 10/2009 | Inoue et al. | |

FOREIGN PATENT DOCUMENTS

| | | |
|---|---|---|
| JP | 2003-5032 | 1/2003 |
| JP | 2005-156719 | 6/2005 |

OTHER PUBLICATIONS

English language Abstract JP 2005-156719, Jun. 16, 2005.
English language Abstract JP 2003-5032, Jan. 8, 2003.

* cited by examiner

*Primary Examiner* — Jorge L Ortiz Criado
(74) *Attorney, Agent, or Firm* — Greenblum & Bernstein P.L.C.

(57) ABSTRACT

An objective lens used for an optical information recording/reproducing apparatus for an optical disc based on a predetermined standard is made of resin and has a numerical aperture larger than or equal to 0.75. When f (unit: mm) represents a focal length at a wavelength λ (unit: nm), d (unit: mm) represents a thickness, and n represents a refractive index of the objective lens at the wavelength λ, the objective lens satisfies following conditions:

$1.00 < f < 1.50$ (1)

$1.55 < d \cdot n/f < 1.82$ (2).

At least a light source side surface of the objective lens is an aspherical surface. The objective lens satisfies a following condition:

$2.80 < (SAG1)'_{MAX} \cdot n < 4.10$ (3), where $(SAG1)'_{MAX}$ represents a maximum gradient of a gradient $(SAG1)'$ of a sag amount SAG of the aspherical surface at the light source side within an effective beam diameter.

10 Claims, 15 Drawing Sheets

OBJECTIVE LENS AND OPTICAL INFORMATION RECORDING/REPRODUCING APPARATUS HAVING THE SAME

BACKGROUND OF THE INVENTION

The present invention relates to an objective lens which is installed in an optical information recording/reproducing apparatus for recording information to and/or reproducing information from an optical disc complying with a predetermined standard.

There exist various standards of optical discs (CD, DVD, etc.) differing in recording density, protective layer thickness, etc. Meanwhile, new-standard optical discs (e.g., BD (Blu-ray Disc), having still higher recording density than DVD, are being brought into practical use in recent years to realize still higher information storage capacity.

Since such a high recoding density optical disc has a recording density higher than that of CD or DVD, it is necessary to form a smaller beam spot for information recording or information reproducing for the high recording density optical disc. In other words, a higher NA (Numerical Aperture) is required for information recording or information reproducing for the high recording density optical disc. For this reason, in general, a glass lens having a relatively high refractive index is employed as an objective lens for the optical information recording/reproducing apparatus for the high recording density optical disc. An example of such a glass lens for an optical pick-up is disclosed in Japanese Patent Provisional Publication No. 2005-156719A.

However, a glass lens has a drawback that since a glass lens is heavy in weight, the glass lens places a burden on operation of an actuator for driving the lens when the actuator moves the lens in a focusing direction or in a tracking direction. Therefore, a designer might consider forming a lens with resin in place of glass in order to reduce weight of the lens.

Japanese Patent Provisional Publication No. 2003-5032A (hereafter, referred to as JP 2003-5032A) discloses an objective lens made of resin for the high recording density optical disc. JP 2003-5032A discloses that by reducing weight of the objective lens by forming the lens with resin, the burden on the actuator can be reduced, and it becomes possible to enable the actuator to perform the precise position control.

SUMMARY OF THE INVENTION

If a lens made of resin is employed as an objective lens for the high recording density optical disc, it becomes necessary to compensate for decrease of lens power caused by decrease of the refractive index with respect to a glass lens. For this reason, the objective lens for the optical information recording/reproducing apparatus is designed to increase power, for example, by increasing the curvature of each surface of the lens. Consequently, a required NA for the information recording and information reproducing for the high recording density optical disc can be secured.

If each surface of a lens made of resin is designed to have a large power, the lens thickness inevitably increases. If each surface of a lens made of resin is designed to increase power while maintaining the lens thickness equal to the lens thickness of a glass lens, the gradient of the lens made of resin becomes steep, and thereby it becomes difficult to secure an adequate thickness of a peripheral part of the lens defined outside the effective diameter of the lens. Hereafter, the thickness of the peripheral part of the lens is referred to as a peripheral part thickness. If the adequate peripheral part thickness can not be secured and thereby the peripheral part thickness of the lens becomes too small, a possibility that the peripheral part is lost arises. Furthermore, if sophisticated control of the injecting pressure for molding the lens made of resin is not achieved, a possibility that resin can not be appropriately poured into a cavity and thereby a required shape of the peripheral part of the lens can not be achieved arises.

An objective lens for the high density optical disc configured to secure a required NA for the information recording or the information reproducing for the high recording density optical disc while maintaining a required peripheral part thickness, for example, by increasing the focal length has been proposed.

As described above, the conventional objective lens for the high recording density optical disc sacrifices the lens thickness or the focal length as compensation for changing the lens material from glass to resin for weight reduction. Increase of the size of the objective lens for the high recording density optical disc caused by increase of the lens thickness or the foal length weakens the advantages of the weight reduction achieved by employing the resin as material of the objective lens.

Furthermore, since the lens thickness increases, it becomes difficult to secure an appropriate working distance which is a distance between a surface of a protective layer of the optical disc and a surface of the objective lens facing the optical disc. Furthermore, in this case, the size of the optical information recording/reproducing apparatus on which the objective lens for the high recording density optical disc is mounted increases. Incidentally, in this specification, the "optical information recording/reproducing apparatus" include devices for both information reproducing and information recording, apparatus exclusively for information reproducing, and apparatus exclusively for information recording.

The present invention is advantageous in that it provides at least one of an objective lens and an optical information recording/reproducing apparatus adapted to information recording or information reproducing for the high recording density optical disc, while effectively suppressing increase of the lens thickness and the focal length is provided.

According to an aspect of the invention, there is provided an objective lens used for an optical information recording/reproducing apparatus for recording information to and/or reproducing information from an optical disc based on a predetermined standard. The objective lens is made of resin and has a numerical aperture larger than or equal to 0.75. When f (unit: mm) represents a focal length of the objective lens with respect to a wavelength $\lambda$ (unit: nm) used for recording information to and/or reproducing information from the optical disc, d (unit: mm) represents a thickness of the objective lens along an optical axis of the objective lens, and n represents a refractive index of the objective lens with respect to the wavelength $\lambda$, the objective lens satisfies following conditions (1) and (2):

$$1.00 < f < 1.50 \tag{1}$$

$$1.55 < d \cdot n/f < 1.82 \tag{2}.$$

At least a light source side surface of the objective lens is an aspherical surface. When h (unit: mm) represents a height from the optical axis, r (unit: mm) represents a curvature radius of the aspherical surface on the optical axis, $\kappa$ represents a conical coefficient, and $A_4, A_6, \ldots$ represent aspherical coefficients larger than or equal to a fourth order, a sag amount SAG which is a distance between a point on the aspherical surface at a height of h from the optical axis and a plane tangential to the aspherical surface at the optical axis is represented by a following equation:

$$SAG = \frac{\frac{h^2}{r}}{1+\sqrt{1-(1+\kappa)\left(\frac{h}{r}\right)^2}} + A_4 h^4 + A_6 h^6 + A_8 h^8 + \ldots.$$

A gradient (SAG)' of the aspherical surface is represented by a following equation:

$$(SAG)' = \frac{d(SAG)}{dh}.$$

The objective lens satisfies a following condition (3):

$$2.80 < (SAG1)'_{MAX} \cdot n < 4.10 \quad (3),$$

where $(SAG1)'_{MAX}$ represents a maximum gradient of the gradient (SAG1)' of the aspherical surface at the light source side within an effective beam diameter.

With this configuration, it becomes possible to provide an objective lens configured to effectively suppress increase of a lens thickness and a focal length while securing an adequate peripheral part thickness.

In at least one aspect, when WD (unit: nun) represents a working distance between a vertex of a optical disc side surface of the objective lens and the optical disc, the objective lens satisfies a following condition (4):

$$-0.35 < (f-d)/WD < 0.22 \quad (4).$$

In at least one aspect, the objective lens satisfies a following condition (5):

$$0.95 < r \cdot n/f < 1.25 \quad (5).$$

In at least one aspect, the objective lens satisfies a following condition (6):

$$1.50 < n < 1.70 \quad (6).$$

In at least one aspect, the objective lens satisfies a following condition (7):

$$380 < \lambda < 420 \quad (7).$$

According to another aspect of the invention, there is provided an optical information recording/reproducing apparatus for recording information to and/or reproducing information from an optical disc based on a predetermined standard by using a light beam having a wavelength of λ. The optical information recording/reproducing apparatus includes a light source that emits the light beam having the wavelength of λ, and one of the above described objective lenses.

With this configuration, it becomes possible to provide an optical information recording/reproducing apparatus on which the above described objective lens suitable for a high recording density optical disc is mounted.

BRIEF DESCRIPTION OF THE ACCOMPANYING DRAWINGS

DETAILED DESCRIPTION OF THE EMBODIMENTS

Hereinafter, an embodiment according to the invention is described with reference to the accompanying drawings.

In the following, an objective lens 10 and an optical information recording/reproducing apparatus 100 on which the objective lens 10 is mounted are described. The optical information recording/reproducing apparatus 100 according to the embodiment performs information recording and information reproducing for a high recording density optical disc complying with a predetermined standard. Hereafter, the high recording density optical disc is referred to as an optical disc D.

Figure 1:
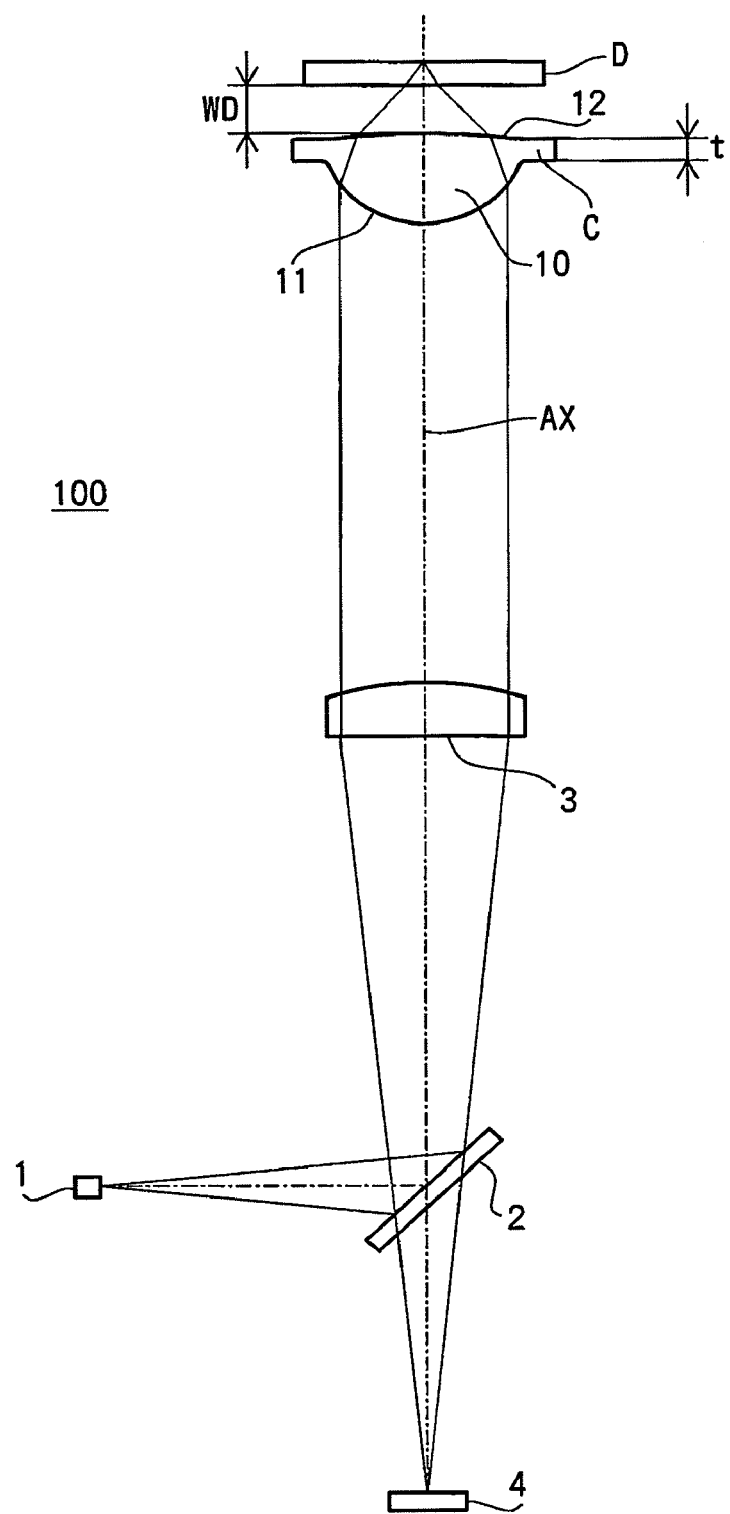
FIG. 1 is illustrates a general configuration of an optical information recording/reproducing apparatus having an objective lens according to an embodiment.

FIG. 1 is illustrates a general configuration of the optical information recording/reproducing apparatus 100 having the objective lens 10. As shown in FIG. 1, the optical information recording/reproducing apparatus 100 includes a light source 1, a half mirror 2, a collimator 3, a photoreceptor 4 and the objective lens 10.

In FIG. 1, a reference axis AX of the optical information recording/reproducing apparatus 100 is indicated by a dashed line. In FIG. 1, each of a light beam incident on the optical disc D and a returning light beam returning from the optical disc D is indicated by a solid line. In a normal state, an optical axis of the objective lens 10 coincides with the reference axis AX. However, the optical axis of the objective lens 10 may shift from the reference axis AX, for example, by a tracking operation.

The optical disc D has a protective layer and a record surface. Practically, the record surface is sandwiched between the protective layer and a substrate layer or a label layer. The optical disc D is placed and rotated on a turn table (not shown) during the information recording or the information reproducing.

The light source 1 is a semiconductor laser emitting a blue laser beam having a design reference wavelength of 405 nm. Considering use environment and individual differences of products, the wavelength $\lambda$ (unit: nm) of the laser beam of the light source 1 fluctuates in a range indicated by a condition (7).

$$380 < \lambda < 420 \tag{7}$$

As shown in FIG. 1, the laser beam emitted by the light source 1 is deflected by the half mirror 2, and is incident on the collimator 3. The laser beam is then converted into a collimated beam by the collimator 3, and is incident on a first surface 11 of the objective lens 10. The laser beam which has entered the objective lens 10 from the first surface 11 emerges from a second surface 12 of the objective lens 10, and is converged by the objective lens 10 at the vicinity of the record surface of the optical disc D being used. The converged laser beam forms a suitable beam spot on the record surface of the optical disc D in a state where aberrations are suitably corrected.

The laser beam reflected from the record surface of the optical disc D returns along the same optical path on which the laser beam proceeds to the optical disc D, and is received by the photoreceptor 4 after passing through the half mirror 2.

The photoreceptor 4 performs photoelectric transfer for the received light, and sends an analog signal obtained by the photoelectric transfer to a signal processing circuit (not shown). The signal processing circuit converts the analog signal into a bit stream to execute an error-correction process. Then, the signal processing circuit separates an audio stream and a video stream from the error-corrected bit stream, and decodes each separated stream. The signal processing circuit converts each stream (e.g., the audio stream or the video stream) into an analog signal to output sound from a speaker (not shown) or to output video from a display (not shown).

Use of a glass lens as the objective lens 10 may place a burden on operation of an actuator (not shown) for driving the objective lens 10 due to the relatively heavy weight of the glass lens. For this reason, the objective lens 10 according to the embodiment is made of resin to reduce weight in comparison with a glass lens. It should be noted that, in addition to weight reduction, use of a lens made of resin provides further advantages of easiness of manufacturing, productivity for mass production and cost reduction.

Furthermore, the objective lens 10 is configured to suppress increase of the lens thickness and the focal length caused by employing resin as material for the objective lens 10 while maintaining appropriate optical performance for the information recording or the information reproducing of the optical disc D. In the following, a concrete configuration of the objective lens 10 is explained.

Since the objective lens 10 is made of resin, the objective lens 10 has an relatively low refractive index with respect to a glass lens. The refractive index n of the objective lens 10 with respect to the wavelength $\lambda$ is expressed by a condition (6) indicated below.

$$1.50 < n < 1.70 \tag{6}$$

Both of the first and second surfaces 11 and 12 of the objective lens 10 are aspherical surfaces.

A shape of an aspherical surface is expressed by a following equation:

$$SAG = \frac{\frac{h^2}{r}}{1 + \sqrt{1 - (1+\kappa)\left(\frac{h}{r}\right)^2}} + A_4 h^4 + A_6 h^6 + A_8 h^8 + \ldots$$

where, SAG (a sag amount) represents is a distance between a point on the aspherical surface at a height of h (unit: mm) from the optical axis and a plane tangential to the aspherical surface at the optical axis, r is a curvature radius (unit: mm) of the aspherical surface on the optical axis (i.e., 1/r represents a curvature of the aspherical surface on the optical axis), $\kappa$ is a conical coefficient, and $A_4$, $A_6$, ... represent aspherical coefficients larger than or equal to the fourth order.

By forming each lens surface of the objective lens 10 to be an aspherical surface, it becomes possible to appropriately control aberrations including the spherical aberration and the coma.

When f (unit: mm) represents the focal length of the objective lens 10 with respect to the wavelength $\lambda$ and d (unit: mm) represents the thickness of the objective lens 10 along the optical axis, the objective lens 10 is configured to satisfy the following conditions (1) and (2).

$$1.00 < f < 1.50 \tag{1}$$

$$1.55 < d \cdot n/f < 1.82 \tag{2}$$

The condition (1) defines the focal length f to appropriately suppress increase of the size of the objective lens 10 and maintain appropriately a working distance WD which is a distance between a vertex of the second surface 12 of the objective lens 10 and the surface of the protective layer of the optical disc D. That is, by satisfying the condition (1), it becomes possible to suppress increase of the size of the objective lens 10 while maintaining appropriately the working distance WD.

If the focal length f gets lower than the lower limit of the condition (1), the focal length becomes too small, and therefore an adequate working distance WD can not be secured regardless of the shape of the objective lens 10. In this case, a possibility that the objective lens 10 collides with the optical disc D even when a shock given to the optical information recording/reproducing apparatus 100 is slight arises.

If the focal length f gets larger than the upper limit of the condition (1), the focal length f becomes too large, and in this case the effective diameter of the objective lens 10 becomes too large when the required NA for the information recording or the information reproducing for the optical disc D is secured. Consequently, downsizing of the objective lens 10 is hampered. The required NA for the objective lens 10 according to the embodiment is, for example, 0.75 to 0.86. Furthermore, since the change amount of spherical aberration with respect to temperature change increases in proportion to the focal length, the reproducing performance for the high recording density optical disc becomes worse as the focal length f becomes large.

The condition (2) defines the lens thickness d to suppress increase of the size of the objective lens and to secure an adequate working distance WD while securing the thickness t of a peripheral part C of the objective lens 10.

If the intermediate term of the condition (2) gets lower than the lower limit of the condition (2), the lens thickness d becomes too small, and therefore it becomes impossible to secure an adequate peripheral part thickness t. If the intermediate term of the condition (2) gets larger than the upper limit of the condition (2), the lens thickness d becomes too large, and therefore the weight of the objective lens 10 becomes too large. In this case, the load on the actuator increases. Furthermore, if the intermediate term of the condition (2) gets larger than the upper limit of the condition (2), the lens thickness d becomes too large with respect to the focal length f, and therefore it becomes difficult to secure an adequate working distance WD.

By satisfying the conditions (1) and (2), the objective lens 10 can be formed such that the increase of each of the lens thickness d and the focal length is suppressed effectively. However, if the objective lens 10 is designed to satisfy only the conditions (1) and (2), design where the curvature of the first surface 11 is increased to secure the required entire lens power is allowed. In this case, a drawback, that even if the condition (2) is satisfied, an adequate peripheral part thickness t can not be secured in terms of the relationship between the gradient of the first surface 11 and the lens thickness d, remains when the curvature of the first surface 11 is set to a large value.

Considering such a drawback, design where power of the second surface 12 is increased by increasing the curvature of the second surface 12 in place of increasing the curvature of the first surface 11 might be employed in order to secure a required entire lens power.

Incidentally, the objective lens 10 is required to correct two types of aberrations including coma (hereafter, referred to as decentering coma) caused by decentering of the objective lens 10 due to, for example, assembling errors, and the coma (hereafter, referred to as off-axis coma) caused when light is converged at a point having a certain image height on a plane substantially perpendicular to the optical axis of the objective lens 10. Each of the decentering coma and the off-axis coma can be corrected by an optical disc side surface of the objective lens 10. That is, by appropriately designing the second surface 12 of the objective lens 10, it becomes possible to suitably correct the decentering coma and the off-axis coma.

However, if the second surface 12 is designed to have relatively large curvature, the second surface 12 is provided with the optical function of refracting a light ray more strongly. Therefore, in this case it becomes necessary to design the second surface 12 such that in addition to correcting the decentering coma and the off-axis coma, the second surface 12 satisfies other aberration properties. Since the decentering coma and the off-axis coma have a trade-off relationship, it is considerably difficult to design the second surface 12 to correct the decentering coma and the off-axis coma while additionally correcting other aberrations.

For this reason, the objective lens 10 is designed such that the gradient (SAG1)' of the first surface 11 defined at the height h on the first surface 11 is expressed by the following expression:

$$(SAG1)' = \frac{d(SAG1)}{dh} = \frac{\frac{h}{r}}{\sqrt{1-(1+\kappa)\left(\frac{h}{r}\right)^2}} + 4A_4 h^3 + 6A_6 h^5 + 8A_8 h^7 + \ldots,$$

and is configured to satisfy the following condition (3):

$$2.80 < (SAG1)'_{MAX} \cdot n < 4.10 \qquad (3),$$

where $(SAG1)'_{MAX}$ represents the maximum gradient of the first surface 11 within an effective beam diameter.

By designing the first surface 11 to satisfy the condition (3), it becomes possible to secure the required entire lens power while suppressing the gradient of the first surface 11 and securing the adequate peripheral part thickness t, without assigning power to the second surface 12. Since power is not assigned to the second surface 12, it becomes possible to design the shape of the second surface 12 to achieve optimum design for correction of the decentering coma and the off-axis coma as in the case of a glass lens.

If the intermediate term of the condition (3) gets lower than the lower limit of the condition (3), it becomes necessary to assign power to the second surface 12 to secure the required entire lens power. Therefore, in this case it becomes impossible to correct the decentering coma and the off-axis coma in a balanced manner, and thereby one of or both of the decentering coma and the off-axis coma increases.

If the intermediate term of the condition (3) gets larger than the upper limit of the condition (3), the gradient of the first surface 11 becomes large, and therefore it becomes impossible to secure the adequate peripheral part thickness t.

By satisfying the conditions (1), (2) and (3), it becomes possible to provide an objective lens made of resin configured to effectively suppress increase of the lens thickness and the focal length and to secure the adequate peripheral part thickness while achieving the appropriate optical performance for information recording and the information reproducing for the high recording density optical disc. Furthermore, by effectively suppressing increase of the lens thickness, advantages that it becomes easier to secure an adequate working distance WD can be achieved.

In addition to satisfying the conditions (1), (2) and (3), the objective lens 10 may be configured to satisfy one of or both of the following conditions (4) and (5).

$$-0.35 < (f-d)/WD < 0.22 \quad (4)$$

$$0.95 < r \cdot n/f < 1.25 \quad (5)$$

More specifically, by satisfying the condition (4) in addition to conditions (1), (2) and (3), it becomes possible to effectively suppress the lens thickness d. That is, by satisfying the condition (4), it becomes possible to further downsize the objective lens 10 and decrease weight of the objective lens 10 while securing the adequate working distance WD.

If the intermediate term of the condition (4) gets lower than the lower limit of the condition (4), the lens thickness d increases, and therefore the weight of the objective lens 10 increases and thereby the load on the actuator for driving the objective lens increases. In another point of view, if the intermediate term of the condition (4) gets lower than the lower limit of the condition (4), the lens thickness d with respect to the focal length f increases and thereby in becomes difficult to secure the adequate working distance WD.

If the intermediate term of the condition (4) gets larger than the upper limit of the condition (4), it becomes difficult to secure the adequate working distance WD. In another point of view, if the intermediate term of the condition (4) gets lager than the upper limit of the condition (4), the lens thickness d with respect to the focal length becomes small, and thereby it becomes difficult to secure the adequate peripheral part thickness.

By satisfying the condition (5) in addition to the condition (1), (2) and (3), it becomes possible to further decrease the curvature of the first surface 11. Therefore, it becomes possible to secure the adequate peripheral part thickness t even if the lens thickness d is further decreased. That is, by satisfying the condition (5), the weight and size of the objective lens 10 can be further decreased, and thereby it becomes further easier to secure an adequate working distance.

If the intermediate term of the condition (5) gets lower than the lower limit of the condition (5), it becomes necessary to assign power to the second surface 12 to secure the required entire lens power. Since in this case the second surface 12 can not be designed as a lens surface dedicated for correction for the decentering coma and the off-axis coma, the correction function of the second surface 12 for correcting the decentering coma and the off-axis coma deteriorates. If the intermediate term of the condition (5) gets larger than the upper limit of the condition (5), the curvature of the first surface 11 becomes too steep and thereby the gradient of the first surface 11 becomes too steep. Consequently, it becomes difficult to secure an adequate peripheral part thickness t.

Hereafter, six concrete numerical examples of the optical information recording/reproducing apparatus 100 having the objective lens 10 and a comparative example to be compared with the six concrete numerical examples are explained. The general configuration of each of the six concrete numerical examples is illustrated in FIG. 1.

FIRST EXAMPLE

Figure 2:
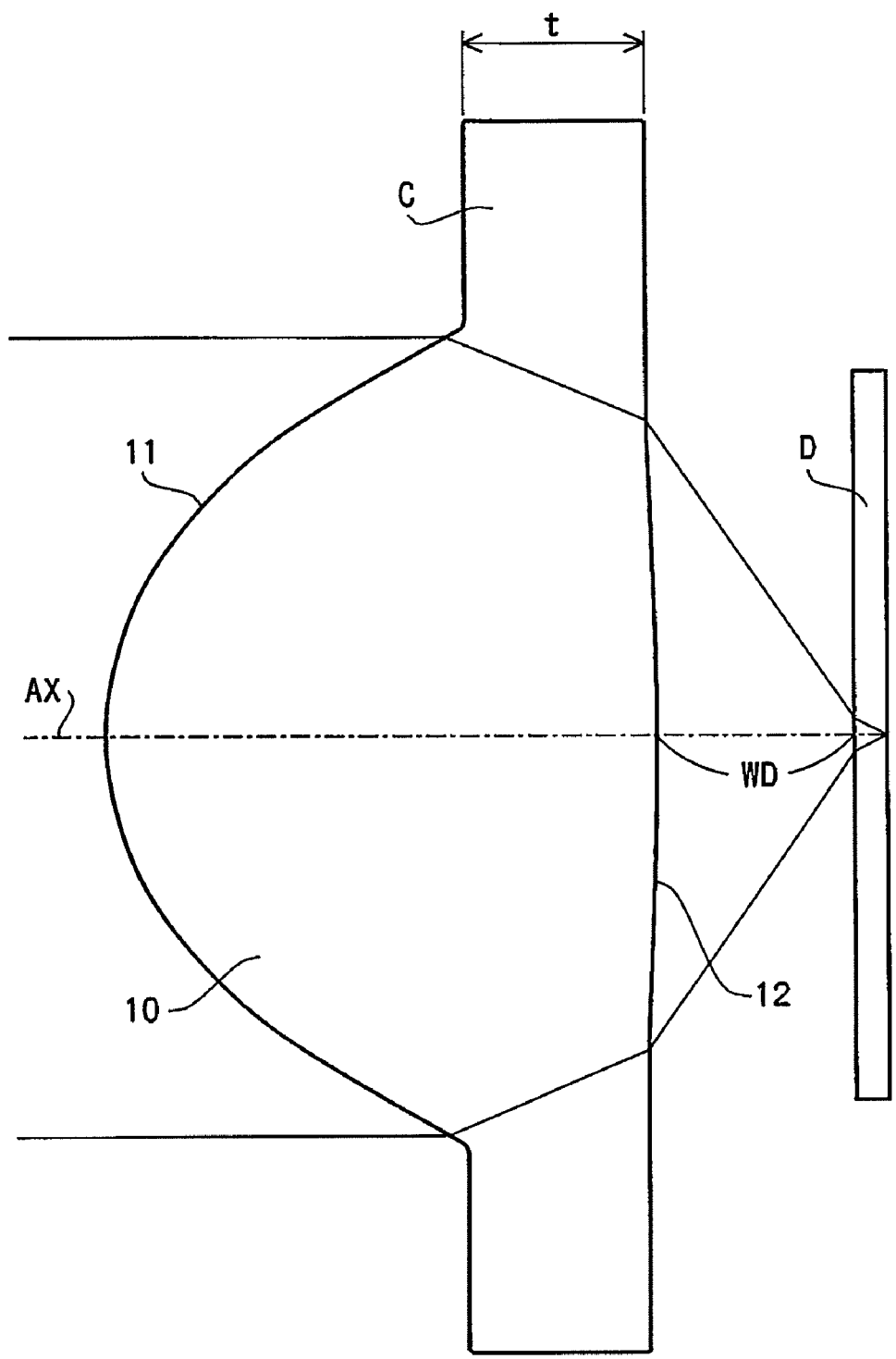
FIG. 2 is an enlarged cross section of a configuration around an objective lens according to a first example.

FIG. 2 is an enlarged cross section of the configuration around the objective lens 10 according to a first example. Concrete specifications of the objective lens 10 according to the first example, i.e., the wavelength $\lambda$ (unit: nm) of the light beam used for information recording and information reproducing for the optical disc D, the focal length f (unit: mm) of the objective lens 10 defined when the optical disc D is used and NA, are indicated below. The wavelength $\lambda$ used for information recording and information reproducing for the optical disc D (i.e., the wavelength of the laser beam emitted from the light source 1) falls within the range defined by the condition (7) even if mode-hopping is taken into consideration.

| | |
|---|---|
| $\lambda$: | 405 |
| f: | 1.35 |
| NA: | 0.85 |

In the following, explanation of the numerical configuration focuses on the configuration of the objective lens 10 and components on the optical disc side of the objective lens 10 (i.e., the objective lens 10 and the optical disc D) for the sake of simplicity.

Table 1 shows a specific numerical configuration of the optical information recording/reproducing apparatus 100 according to the first example defined when the optical disc D is used.

TABLE 1

| Surface No. | r | d | n |
|---|---|---|---|
| 1 | 0.955 | 1.430 | 1.651 |
| 2 | −4.513 | 0.499 | |
| 3 | ∞ | 0.087 | 1.622 |
| 4 | ∞ | | |

In Table 1, the surface numbers #1 and #2 represent the first surface 11 and the second surface 12 of the objective lens 10, respectively, and the surface numbers #3 and #4 represent the protective layer and the record surface of the optical disc D, respectively. In Table 1 (and in the following similar Tables), "r" denotes the curvature radius (unit: mm) of each optical surface, and "d" denotes the thickness of an optical components or the distance (unit: mm) from each optical surface to the next optical surface during the information reproduction/recordation, and "n" represents the refractive index at the wavelength $\lambda$. For an aspherical optical element, "r" represents the curvature radius on the optical axis.

Each of the first surface 11 (surface #1) and the second surface 12 (surface #2) of the objective lens 10 is an aspherical surface. Each aspherical surface is optimally designed for information recording and information reproducing for the optical disc D. The following Table 2 shows the conical coefficients $\kappa$ and aspherical coefficients $A_4, A_6 \ldots$ of each aspherical surface. In Table 2 (and in the following similar Tables), the notation "E" means the power of 10 with an exponent specified by the number to the right of E (e.g. "E-04" means "$\times 10^{-4}$").

TABLE 2

| | surface #1 | surface #2 |
|---|---|---|
| $\kappa$ | −0.620 | 0.000 |
| A4 | 2.55800E−02 | 4.53800E−01 |
| A6 | −8.64600E−03 | −9.78300E−01 |
| A8 | 1.37970E−01 | 1.55100E+00 |
| A10 | −4.29330E−01 | −2.26800E+00 |
| A12 | 7.90790E−01 | 2.49080E+00 |
| A14 | −8.32470E−01 | −1.80020E+00 |
| A16 | 4.72450E−01 | 7.55400E−01 |
| A18 | −1.14830E−01 | −1.39250E−01 |

As described above, the focal length f, the refractive index n and the wavelength λ of the first example satisfy the conditions (1), (6) and (7). Based on the numeric values in the first example, "d·n/f", "(SAG1)'$_{MAX}$·n", "(f−d)/WD" and "r·n/f" are obtained as 1.749, 2.807, −0.160 and 1.168, respectively. That is, all of the conditions (1) to (7) are satisfied in the first example. Therefore, according to the first example, it is possible to provide a resin objective lens suitable for information recording and information reproducing for the high recording density optical disc. That is, the resin objective lens configured to effectively suppress increase of the lens thickness and the focal length while securing the adequate peripheral part thickness can be provided.

Hereafter, optical performance of the objective lens 10 according to the first example is explained with reference to various aberration diagrams to show that the objective lens 10 is suitable for information recording and information reproducing for the high recording density optical disc.

Figure 3A:
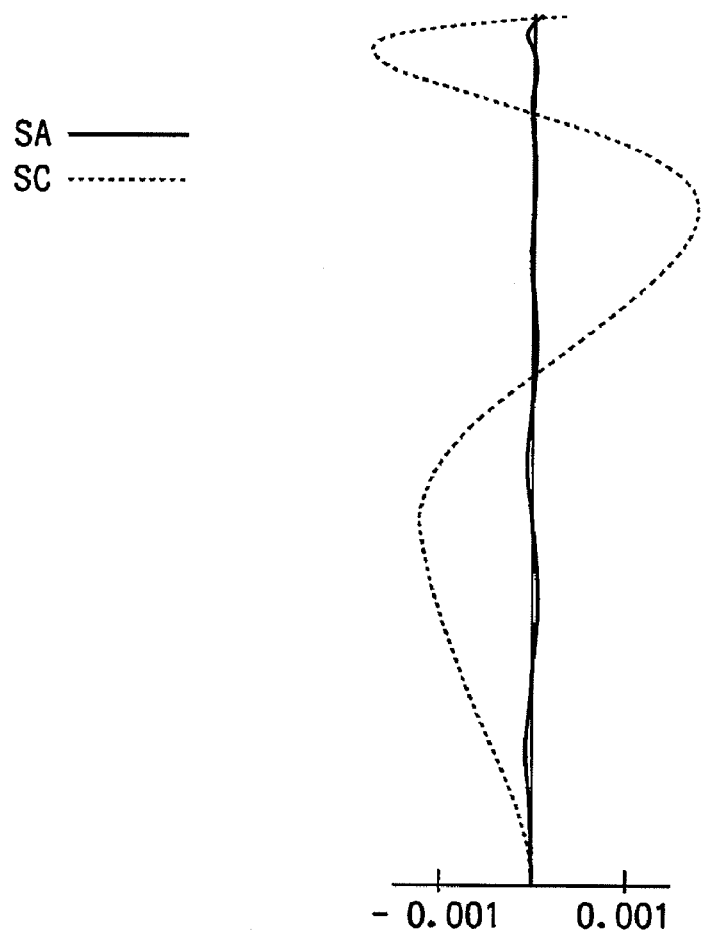
FIG. 3A is a graph illustrating the spherical aberration and the offense of the since condition caused when a high recording density optical disc is used in the optical information recording/reproducing apparatus according to the first example.
Figure 3B:
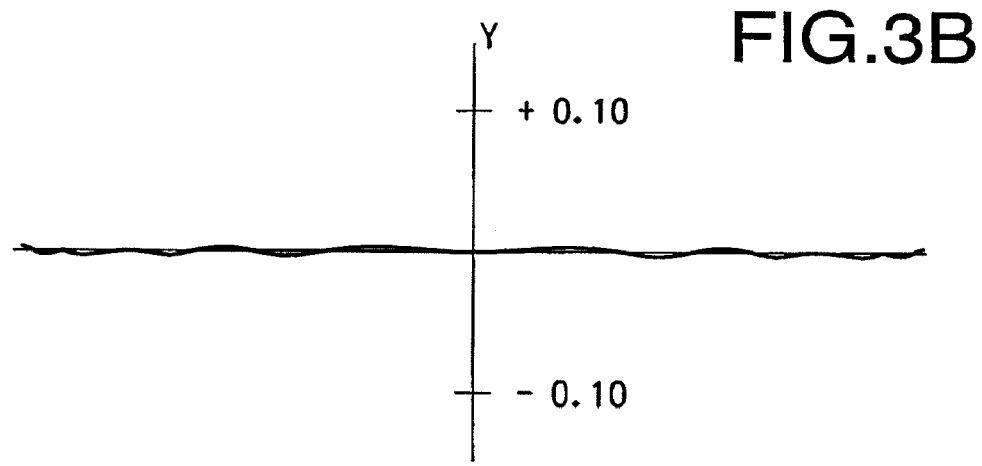
FIG. 3B is a graph illustrating the wavefront aberration caused when the high recording density optical disc is used in the optical information recording/reproducing apparatus according to the first example.

FIG. 3A is a graph illustrating the spherical aberration SA and the offense against the since condition SC caused when the optical disc D is used in the optical information recording/reproducing apparatus 100 according to the first example. FIG. 3B is a graph illustrating the wavefront aberration caused when the optical disc D is used in the optical information recording/reproducing apparatus 100 according to the first example. In FIG. 3A (and in the following similar graphs), the vertical axis represents the coordinate of the entrance pupil, and the horizontal axis represents the amount of the spherical aberration (mm) or the offense against the sine condition. Further, in FIG. 3A (and in the following similar graphs), the curve indicated by a solid line represents the spherical aberration SA at the design wavelength (λ=405 nm), and the curve indicated by a dotted line represents the offense against the sine condition.

In FIG. 3B (and in the following similar graphs), the vertical axis represents the amount of the wavefront aberration, and the horizontal axis represents the coordinate of the entrance pupil.

As can be seen from FIG. 3A, the spherical aberration caused when the optical disc D is used is suitably corrected. It is also understood that the offense against the sine condition is also suitably suppressed, and the coma is suitably corrected.

As can be seen from FIG. 3B, the degree of wavefront undulation is small. Therefore, it becomes possible to form a minute beam spot on the record surface of the optical disc D. As described above, according to the objective lens 10 of the first example, the aberrations are suitably corrected while achieving the NA required for information recording and information reproducing for the optical disc D. Consequently, it becomes possible to ensure performing information recording and information reproducing with high degree of precision for the optical disc D.

SECOND EXAMPLE

Figure 4:
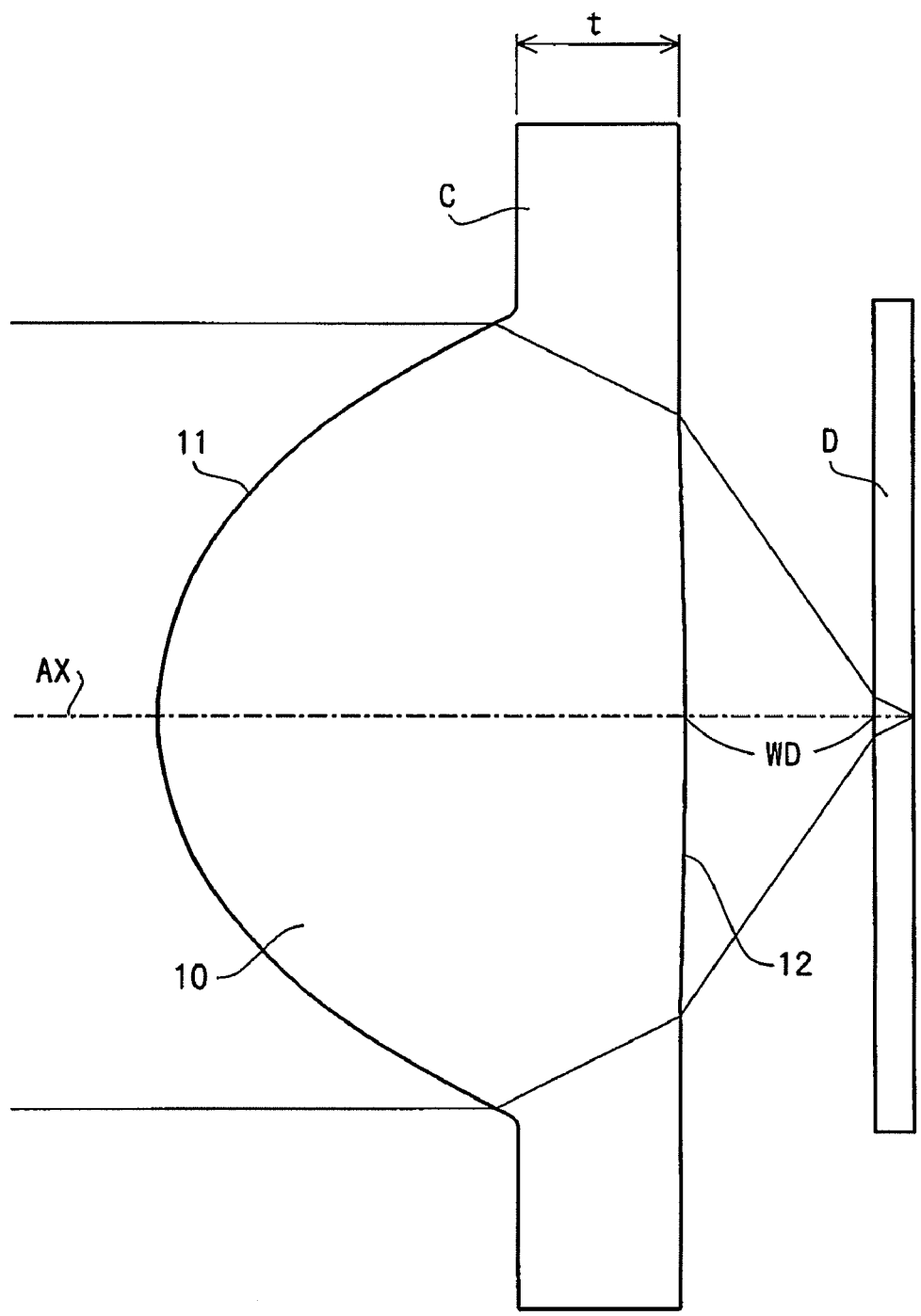
FIG. 4 is an enlarged cross section of a configuration around an objective lens according to a second example.

FIG. 4 is an enlarged cross section of the configuration around the objective lens 10 according to a second example. Concrete specifications of the objective lens 10 according to the second example, i.e., the wavelength λ(unit: nm) of the light beam used for information recording and information reproducing for the optical disc D, the focal length f (unit: mm) of the objective lens 10 defined when the optical disc D is used and NA, are indicated below.

| λ: | 405 |
| f: | 1.15 |
| NA: | 0.85 |

Table 3 shows a specific numerical configuration of the optical information recording/reproducing apparatus 100 according to the second example defined when the optical disc D is used.

TABLE 3

| Surface No. | R | d | n |
| --- | --- | --- | --- |
| 1 | 0.810 | 1.200 | 1.651 |
| 2 | −4.109 | 0.424 | |
| 3 | ∞ | 0.087 | 1.622 |
| 4 | ∞ | | |

In Table 3, the surface numbers #1 and #2 represent the first surface 11 and the second surface 12, respectively, and the surface numbers #3 and #4 represent the protective layer and the record surface of the optical disc D, respectively.

Each of the first surface 11 (surface #1) and the second surface 12 (surface #2) of the objective lens 10 is an aspherical surface. The following Table 4 shows the conical coefficients κ and aspherical coefficients $A_4, A_6 \ldots$ of each aspherical surface.

TABLE 4

| | Surface #1 | Surface #2 |
| --- | --- | --- |
| κ | −0.620 | 0.000 |
| A4 | 4.24300E−02 | 7.53100E−01 |
| A6 | 3.39100E−02 | −2.67200E+00 |
| A8 | −8.06800E−02 | 7.48000E+00 |
| A10 | 7.55800E−01 | −1.44500E+01 |
| A12 | −3.08600E+00 | 1.35600E+01 |
| A14 | 7.28230E+00 | 2.40670E+00 |
| A16 | −9.92520E+00 | −1.89880E+01 |
| A18 | 7.32430E+00 | 1.73420E+01 |
| A20 | −2.29210E+00 | −5.41150E+00 |

As described above, the focal length f, the refractive index n and the wavelength λ of the second example satisfy the conditions (1), (6) and (7). Based on the numeric values in the second example, "d·n/f", "(SAG1)'$_{MAX}$·n", "(f−d)/WD" and "r·n/f" are obtained as 1.723, 3.054, −0.118 and 1.163, respectively. That is, all of the conditions (1) to (7) are satisfied in the second example. Therefore, according to the second example, it is possible to provide a resin objective lens suitable for information recording and information reproducing for the high recording density optical disc. That is, the resin objective lens configured to effectively suppress increase of the lens thickness and the focal length while securing the adequate peripheral part thickness can be provided.

Figure 5A:
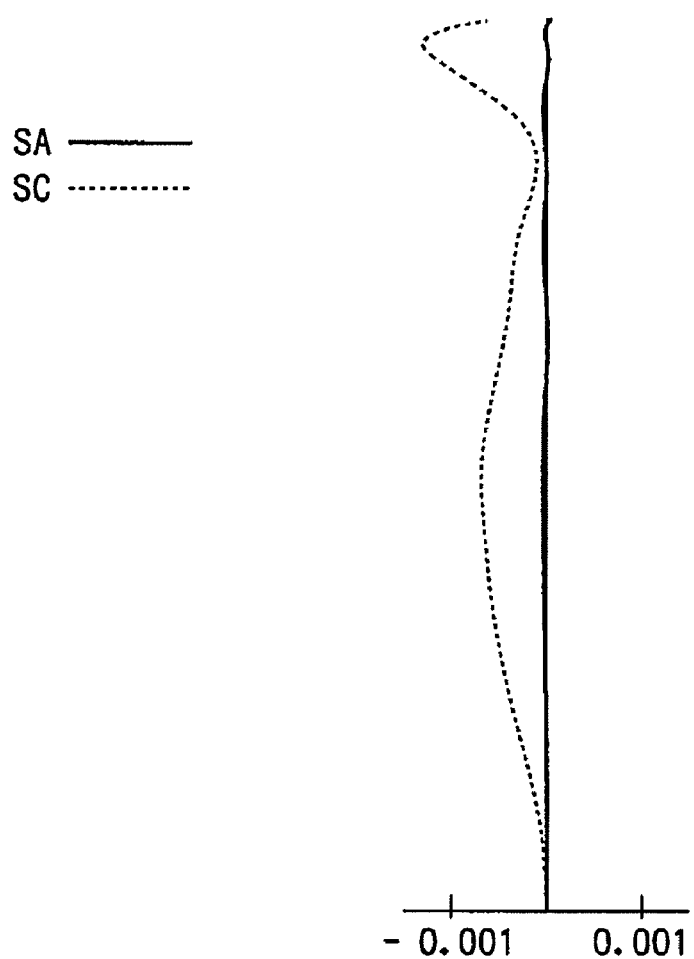
FIG. 5A is a graph illustrating the spherical aberration and the offense of the since condition caused when the high recording density optical disc is used in the optical information recording/reproducing apparatus according to the second example.
Figure 5B:
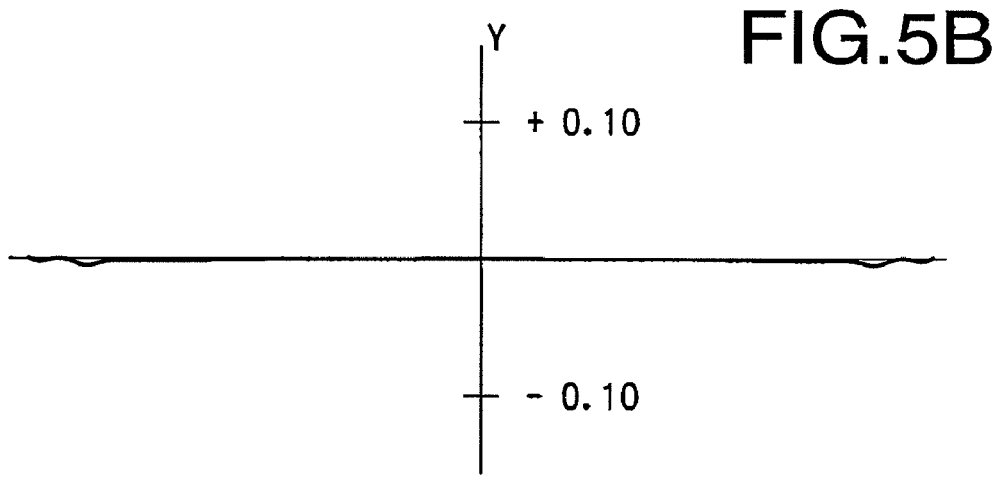
FIG. 5B is a graph illustrating the wavefront aberration caused when the high recording density optical disc is used in the optical information recording/reproducing apparatus according to the second example.

FIG. 5A is a graph illustrating the spherical aberration SA and the offense against the since condition SC caused when the optical disc D is used in the optical information recording/reproducing apparatus 100 according to the second example. FIG. 5B is a graph illustrating the wavefront aberration caused when the optical disc D is used in the optical information recording/reproducing apparatus 100 according to the second example.

As can be seen from FIG. 5A, the spherical aberration caused when the optical disc D is used is suitably corrected. It is also understood that the offense against the sine condition is also suitably suppressed, and the coma is suitably corrected.

As can be seen from FIG. 5B, the degree of wavefront undulation is small. Therefore, it becomes possible to form a minute beam spot on the record surface of the optical disc D. As described above, according to the objective lens 10 of the second example, the aberrations are suitably corrected while achieving the NA required for information recording and information reproducing for the optical disc D. Consequently, it becomes possible to ensure performing information recording and information reproducing with high degree of precision for the optical disc D.

THIRD EXAMPLE

Figure 6:
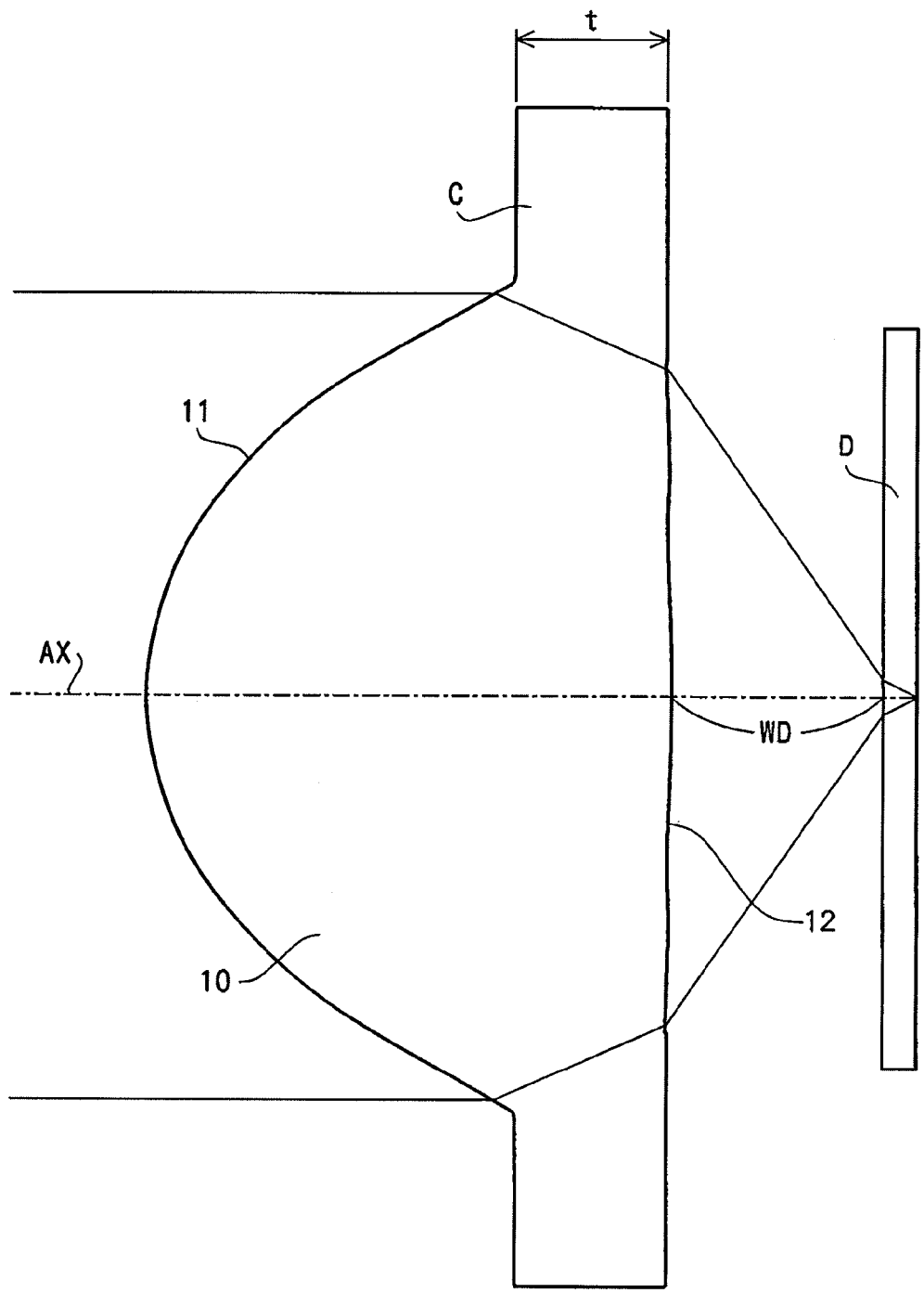
FIG. 6 is an enlarged cross section of a configuration around an objective lens according to a third example.

FIG. 6 is an enlarged cross section of the configuration around the objective lens 10 according to a third example. Concrete specifications of the objective lens 10 according to the third example, i.e., the wavelength λ (unit: nm) of the light beam used for information recording and information reproducing for the optical disc D, the focal length f (unit: mm) of the objective lens 10 defined when the optical disc D is used and NA, are indicated below.

| λ: | 405 |
|---|---|
| f: | 1.35 |
| NA: | 0.85 |

Table 5 shows a specific numerical configuration of the optical information recording/reproducing apparatus 100 according to the third example defined when the optical disc D is used.

TABLE 5

| Surface No. | R | d | n |
|---|---|---|---|
| 1 | 0.943 | 1.350 | 1.651 |
| 2 | −5.624 | 0.534 | |
| 3 | ∞ | 0.087 | 1.622 |
| 4 | ∞ | | |

In Table 5, the surface numbers #1 and #2 represent the first surface 11 and the second surface 12, respectively, and the surface numbers #3 and #4 represent the protective layer and the record surface of the optical disc D, respectively.

Each of the first surface 11 (surface #1) and the second surface 12 (surface #2) of the objective lens 10 is an aspherical surface. The following Table 6 shows the conical coefficients K and aspherical coefficients $A_4, A_6 \ldots$ of each aspherical surface.

TABLE 6

| | Surface #1 | Surface #2 |
|---|---|---|
| κ | −0.620 | 0.000 |
| A4 | 2.70000E−02 | 4.01900E−01 |
| A6 | 1.18900E−02 | −1.03900E+00 |
| A8 | −6.36400E−03 | 2.33600E+00 |
| A10 | 1.18040E−01 | −3.82700E+00 |
| A12 | −4.32610E−01 | 3.66900E+00 |
| A14 | 8.34080E−01 | −1.66410E+00 |
| A16 | −8.88840E−01 | −1.04850E−01 |
| A18 | 5.03230E−01 | 4.19310E−01 |
| A20 | −1.19810E−01 | −1.21460E−01 |

As described above, the focal length f, the refractive index n and the wavelength λ of the third example satisfy the conditions (1), (6) and (7). Based on the numeric values in the third example, "d·n/f", "(SAG1)'$_{MAX}$·n", "(f−d)/WD" and "r·n/f" are obtained as 1.651, 3.054, 0.000 and 1.153, respectively. That is, all of the conditions (1) to (7) are satisfied in the third example. Therefore, according to the third example, it is possible to provide a resin objective lens suitable for information recording and information reproducing for the high recording density optical disc. That is, the resin objective lens configured to effectively suppress increase of the lens thickness and the focal length while securing the adequate peripheral part thickness can be provided.

Figure 7A:
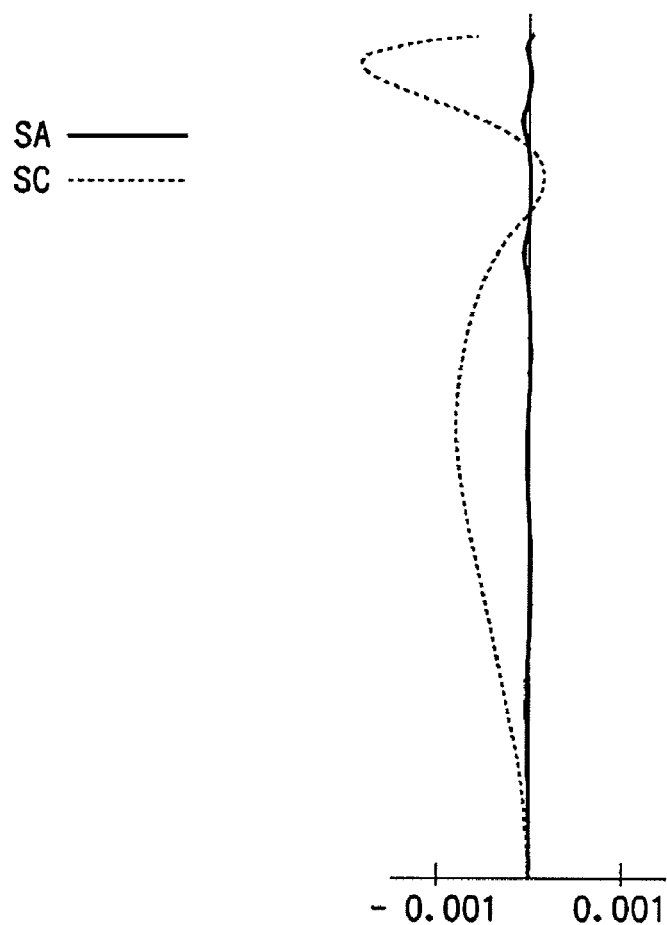
FIG. 7A is a graph illustrating the spherical aberration and the offense of the since condition caused when the high recording density optical disc is used in the optical information recording/reproducing apparatus according to the third example.
Figure 7B:
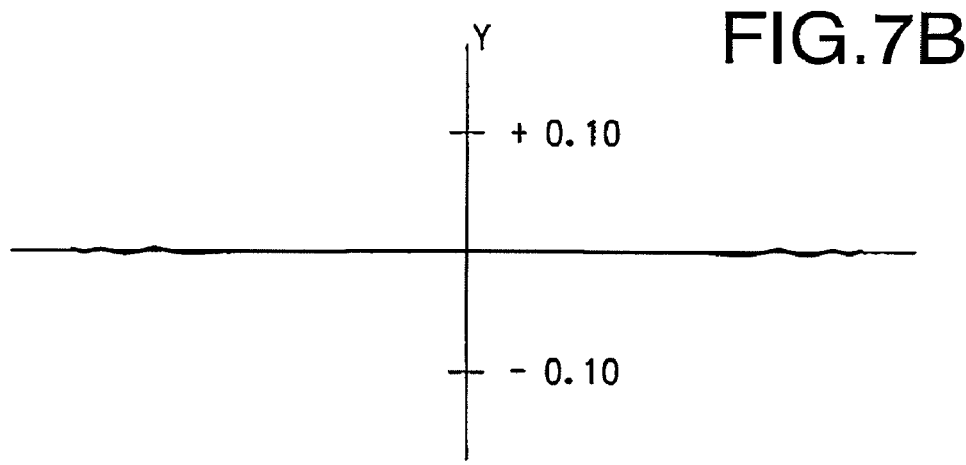
FIG. 7B is a graph illustrating the wavefront aberration caused when the high recording density optical disc is used in the optical information recording/reproducing apparatus according to the third example.

FIG. 7A is a graph illustrating the spherical aberration SA and the offense of the since condition SC caused when the optical disc D is used in the optical information recording/reproducing apparatus 100 according to the third example. FIG. 7B is a graph illustrating the wavefront aberration caused when the optical disc D is used in the optical information recording/reproducing apparatus 100 according to the third example.

As can be seen from FIG. 7A, the spherical aberration caused when the optical disc D is used is suitably corrected. It is also understood that the offense against the sine condition is also suitably suppressed, and the coma is suitably corrected.

As can be seen from FIG. 7B, the degree of wavefront undulation is small. Therefore, it becomes possible to form a minute beam spot on the record surface of the optical disc D. As described above, according to the objective lens 10 of the third example, the aberrations are suitable corrected while achieving the NA required for information recording and information reproducing for the optical disc D. Consequently, it becomes possible to ensure performing information recording and information reproducing with high degree of precision for the optical disc D.

FOURTH EXAMPLE

Figure 8:
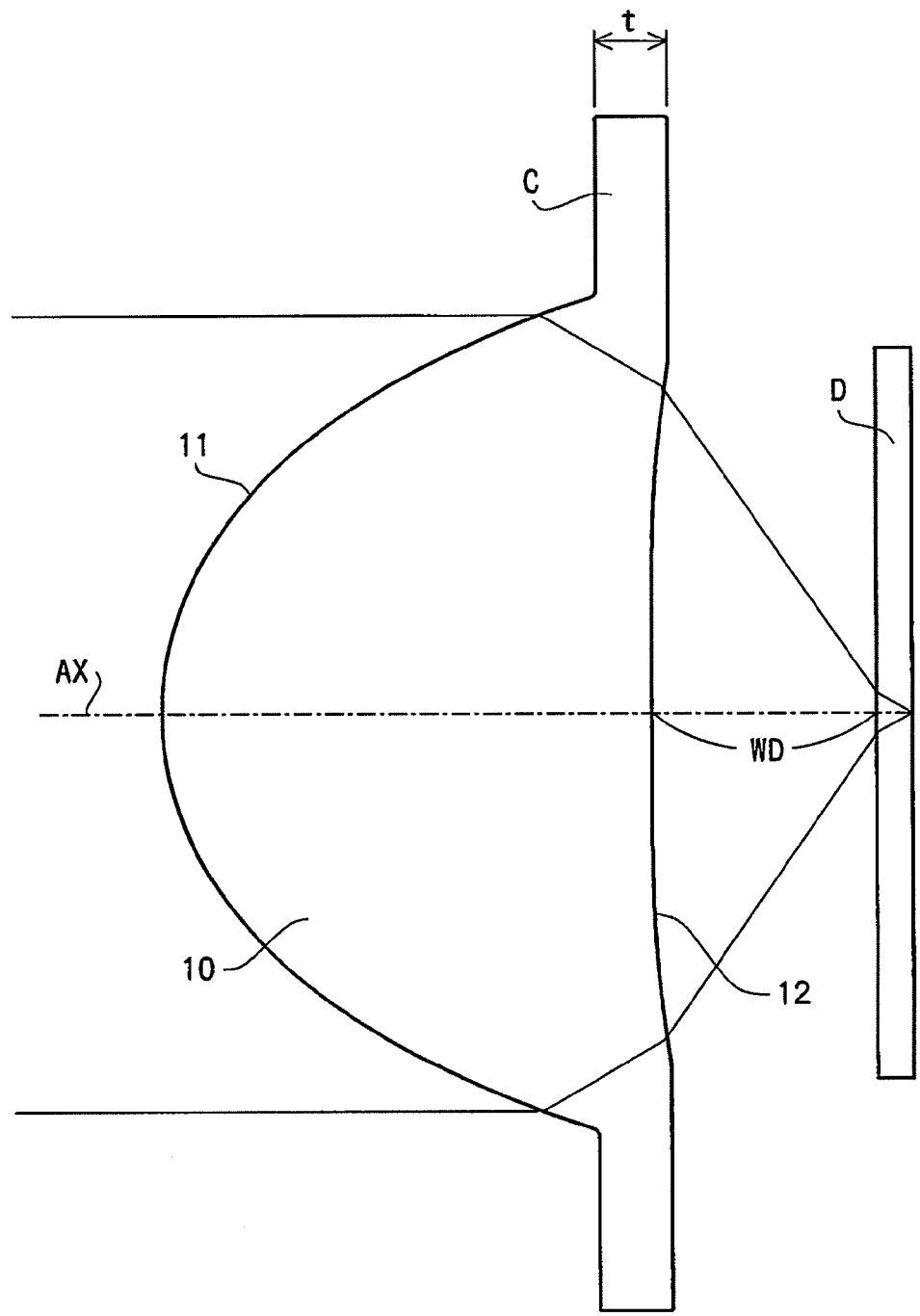
FIG. 8 is an enlarged cross section of a configuration around an objective lens according to a fourth example.

FIG. 8 is an enlarged cross section of the configuration around the objective lens 10 according to a fourth example. Concrete specifications of the objective lens 10 according to the fourth example, i.e., the wavelength λ (unit: nm) of the light beam used for information recording and information reproducing for the optical disc D, the focal length f (unit: mm) of the objective lens 10 defined when the optical disc D is used and NA, are indicated below.

| λ: | 405 |
|---|---|
| f: | 1.35 |
| NA: | 0.85 |

Table 7 shows a specific numerical configuration of the optical information recording/reproducing apparatus 100 according to the fourth example defined when the optical disc D is used.

TABLE 7

| Surface No. | R | d | n |
|---|---|---|---|
| 1 | 0.933 | 1.270 | 1.651 |
| 2 | −7.012 | 0.571 | |
| 3 | ∞ | 0.087 | 1.622 |
| 4 | ∞ | | |

In Table 7, the surface numbers #1 and #2 represent the first surface 11 and the second surface 12, respectively, and the surface numbers #3 and #4 represent the protective layer and the record surface of the optical disc D, respectively.

Each of the first surface 11 (surface #1) and the second surface 12 (surface #2) of the objective lens 10 is an aspherical surface. The following Table 8 shows the conical coefficients κ and aspherical coefficients $A_4, A_6 \ldots$ of each aspherical surface.

TABLE 8

|     | Surface #1   | Surface #2   |
|-----|--------------|--------------|
| κ   | −0.620       | 0.000        |
| A4  | 2.66400E−02  | 3.13200E−01  |
| A6  | 2.43400E−02  | −4.61100E−01 |
| A8  | −3.85300E−02 | 5.31900E−01  |
| A10 | 1.27700E−01  | −6.04200E−01 |
| A12 | −1.72200E−01 | 5.35250E−01  |
| A14 | 1.26060E−01  | −2.78000E−01 |
| A16 | −3.74570E−02 | 6.05820E−02  |

As described above, the focal length f, the refractive index n and the wavelength λ of the fourth example satisfy the conditions (1), (6) and (7). Based on the numeric values in the fourth example, "d·n/f", "(SAG1)'$_{MAX}$·n", "(f−d)/WD" and "r·n/f" are obtained as 1.553, 3.950, 0.140, 1.141, respectively. That is, all of the conditions (1) to (7) are satisfied in the fourth example. Therefore, according to the fourth example, it is possible to provide a resin objective lens suitable for information recording and information reproducing for the high recording density optical disc. That is, the resin objective lens configured to effectively suppress increase of the lens thickness and the focal length while securing the adequate peripheral part thickness can be provided.

Figure 9A:
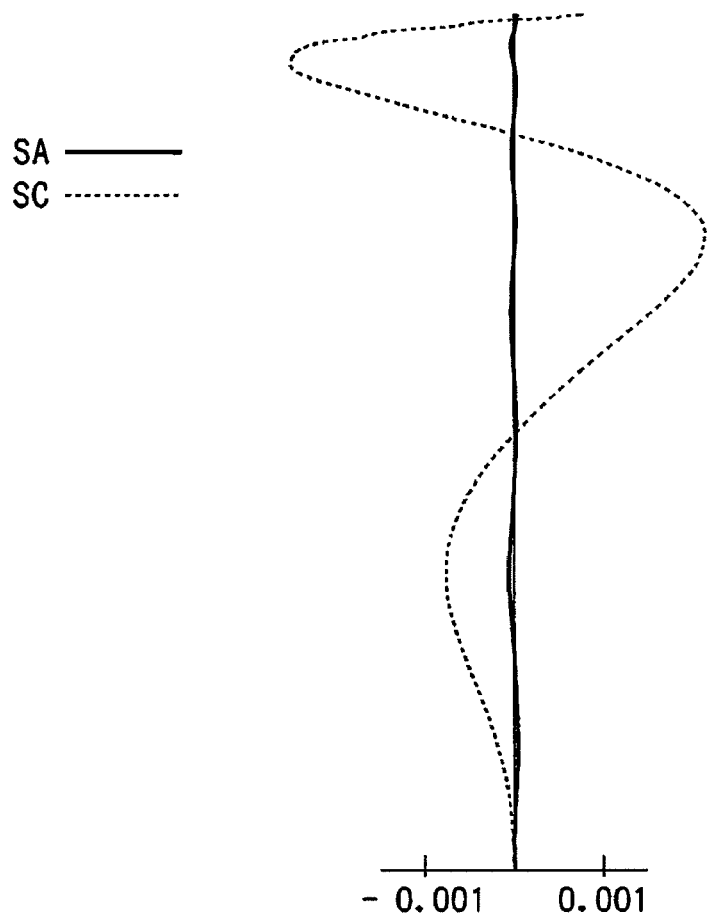
FIG. 9A is a graph illustrating the spherical aberration and the offense of the since condition caused when the high recording density optical disc is used in the optical information recording/reproducing apparatus according to the fourth example.
Figure 9B:
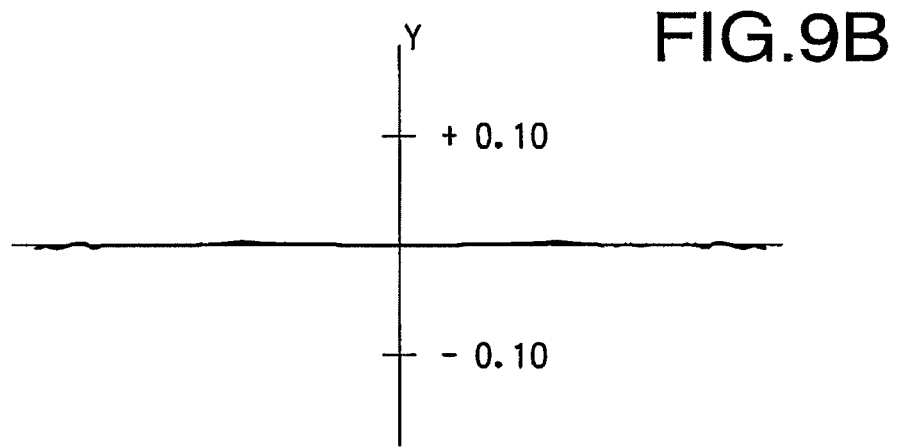
FIG. 9B is a graph illustrating the wavefront aberration caused when the high recording density optical disc is used in the optical information recording/reproducing apparatus according to the fourth example.

FIG. 9A is a graph illustrating the spherical aberration SA and the offense of the since condition SC caused when the optical disc D is used in the optical information recording/reproducing apparatus 100 according to the fourth example. FIG. 9B is a graph illustrating the wavefront aberration caused when the optical disc D is used in the optical information recording/reproducing apparatus 100 according to the fourth example.

As can be seen from FIG. 9A, the spherical aberration caused when the optical disc D is used is suitably corrected. It is also understood that the offense against the sine condition is also suitably suppressed, and the coma is suitably corrected.

As can be seen from FIG. 9B, the degree of wavefront undulation is small. Therefore, it becomes possible to form a minute beam spot on the record surface of the optical disc D. As described above, according to the objective lens 10 of the fourth example, the aberrations are suitably corrected while achieving the NA required for information recording and information reproducing for the optical disc D. Consequently, it becomes possible to ensure performing information recording and information reproducing with high degree of precision for the optical disc D.

FIFTH EXAMPLE

Figure 10:
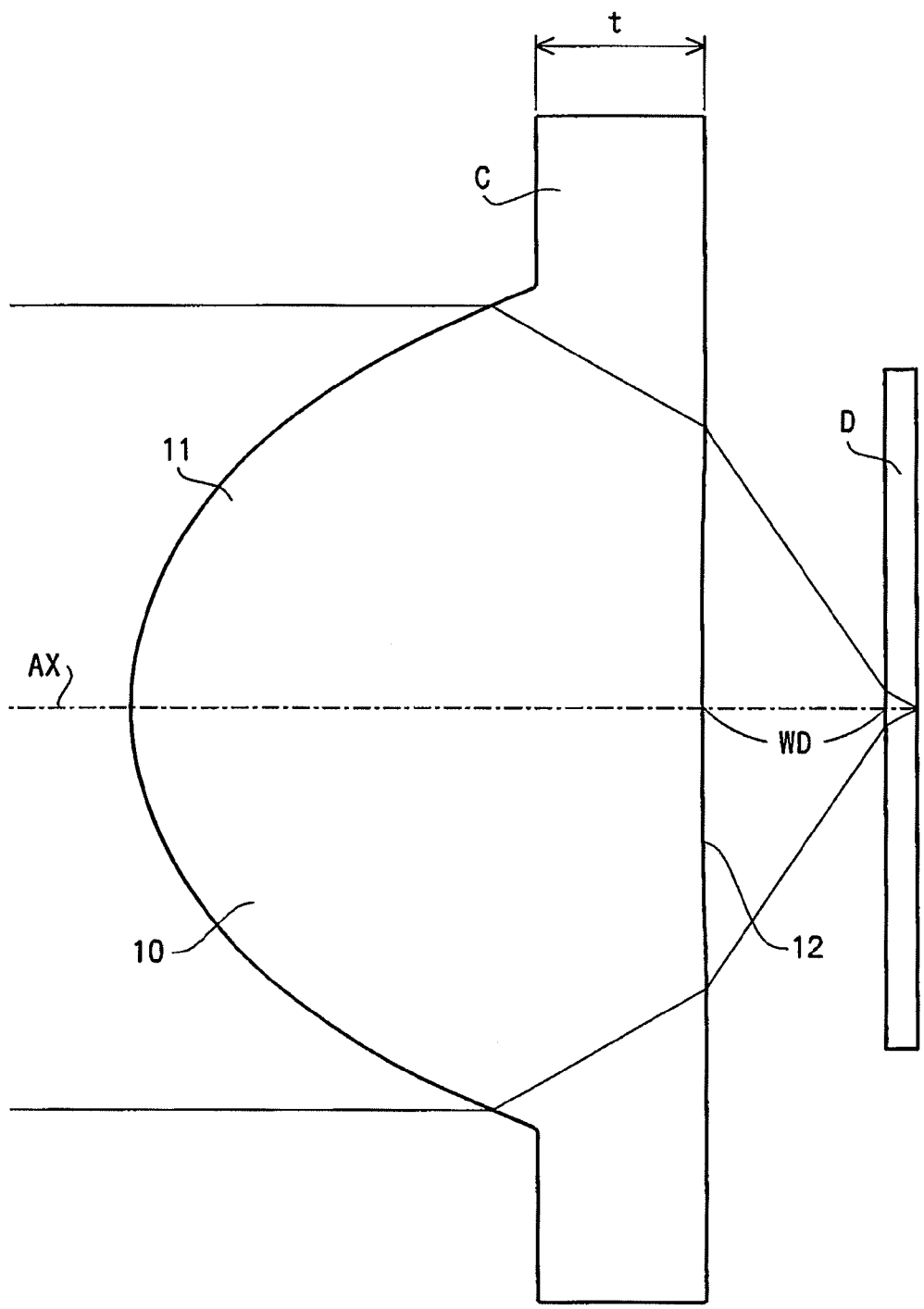
FIG. 10 is an enlarged cross section of a configuration around an objective lens according to a fifth example.

FIG. 10 is an enlarged cross section of the configuration around the objective lens 10 according to a fifth example. Concrete specifications of the objective lens 10 according to the fifth example, i.e., the wavelength λ (unit: nm) of the light beam used for information recording and information reproducing for the optical disc D, the focal length f (unit: mm) of the objective lens 10 defined when the optical disc D is used and NA, are indicated below.

| λ:  | 405  |
|-----|------|
| f:  | 1.47 |
| NA: | 0.85 |

Table 9 shows a specific numerical configuration of the optical information recording/reproducing apparatus 100 according to the fifth example defined when the optical disc D is used.

TABLE 9

| Surface No. | R      | d     | n     |
|-------------|--------|-------|-------|
| 1           | 1.035  | 1.620 | 1.651 |
| 2           | −4.858 | 0.509 |       |
| 3           | ∞      | 0.087 | 1.622 |
| 4           | ∞      |       |       |

In Table 9, the surface numbers #1 and #2 represent the first surface 11 and the second surface 12, respectively, and the surface numbers #3 and #4 represent the protective layer and the record surface of the optical disc D, respectively.

Each of the first surface 11 (surface #1) and the second surface 12 (surface #2) of the objective lens 10 is an aspherical surface. The following Table 10 shows the conical coefficients κ and aspherical coefficients $A_4, A_6 \ldots$ of each aspherical surface.

TABLE 10

|     | Surface #1   | Surface #2   |
|-----|--------------|--------------|
| κ   | −0.620       | 0.000        |
| A4  | 1.99500E−02  | 4.51600E−01  |
| A6  | 1.65700E−02  | −9.85600E−01 |
| A8  | −3.01800E−02 | 1.81700E+00  |
| A10 | 7.50410E−02  | −2.75450E+00 |
| A12 | −8.48430E−02 | 2.79000E+00  |
| A14 | 5.05320E−02  | −1.59000E+00 |
| A16 | −1.21630E−02 | 3.81570E−01  |

As described above, the focal length f, the refractive index n and the wavelength λ of the fifth example satisfy the conditions (1), (6) and (7). Based on the numeric values in the fifth example, "d·n/f", "(SAG1)'$_{MAX}$·n", "(f−d)/WD" and "r·n/f" are obtained as 1.819, 3.632, −0.295, 1.162, respectively. That is, all of the conditions (1) to (7) are satisfied in the fifth example. Therefore, according to the fifth example, it is possible to provide a resin objective lens suitable for information recording and information reproducing for the high recording density optical disc. That is, the resin objective lens configured to effectively suppress increase of the lens thickness and the focal length while securing the adequate peripheral part thickness can be provided.

Figure 11A:
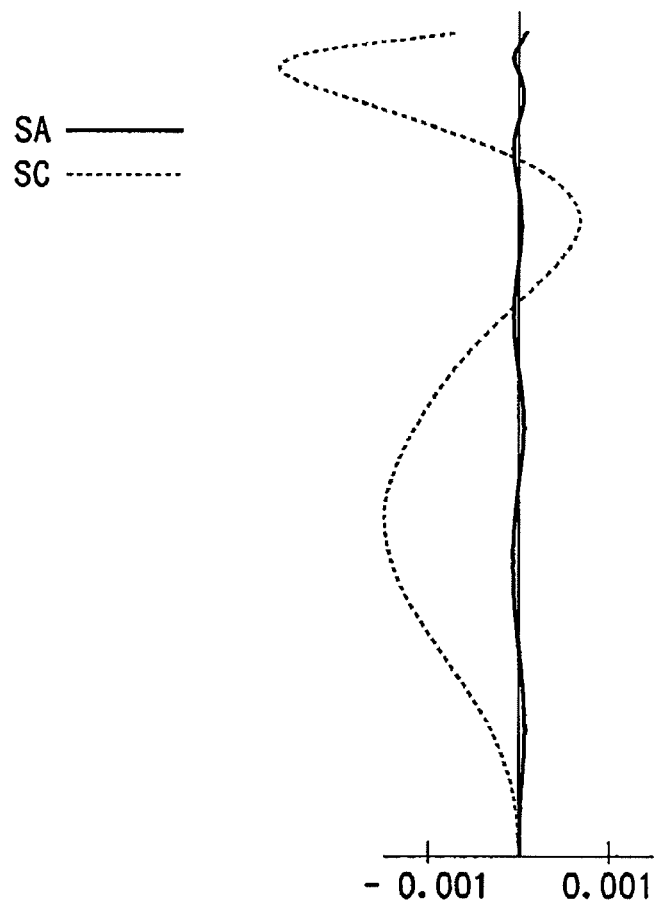
FIG. 11A is a graph illustrating the spherical aberration and the offense of the since condition caused when the high recording density optical disc is used in the optical information recording/reproducing apparatus according to the fifth example.

FIG. 11A is a graph illustrating the spherical aberration SA and the offense against the since condition SC caused when the optical disc D is used in the optical information recording/reproducing apparatus 100 according to the fifth example. FIG. 9B is a graph illustrating the wavefront aberration caused when the optical disc D is used in the optical information recording/reproducing apparatus 100 according to the fifth example.

As can be seen from FIG. 11A, the spherical aberration caused when the optical disc D is used is suitably corrected. It is also understood that the offense against the sine condition is also suitably suppressed, and the coma is suitably corrected.

Figure 11B:
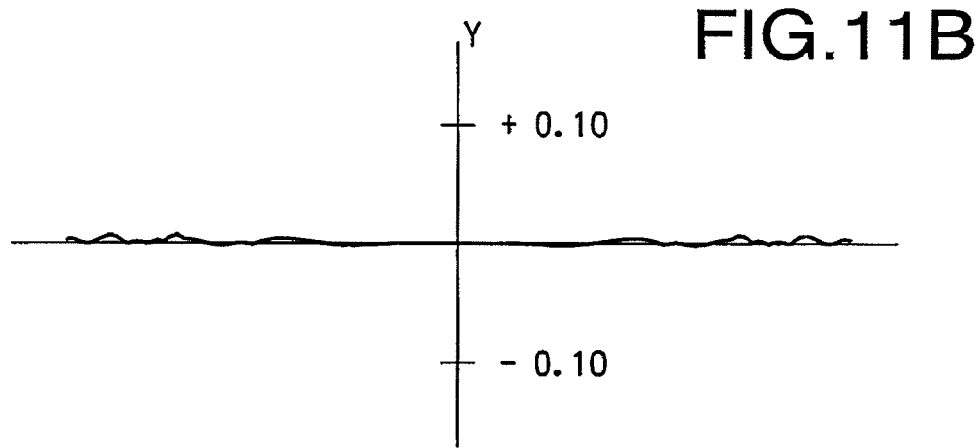
FIG. 11B is a graph illustrating the wavefront aberration caused when the high recording density optical disc is used in the optical information recording/reproducing apparatus according to the fifth example.

As can be seen from FIG. 11B, the degree of wavefront undulation is small. Therefore, it becomes possible to form a minute beam spot on the record surface of the optical disc D. As described above, according to the objective lens 10 of the fifth example, the aberrations are suitable corrected while achieving the NA required for information recording and information reproducing for the optical disc D. Consequently, it becomes possible to ensure performing information recording and information reproducing with high degree of precision for the optical disc D.

SIXTH EXAMPLE

Figure 12:
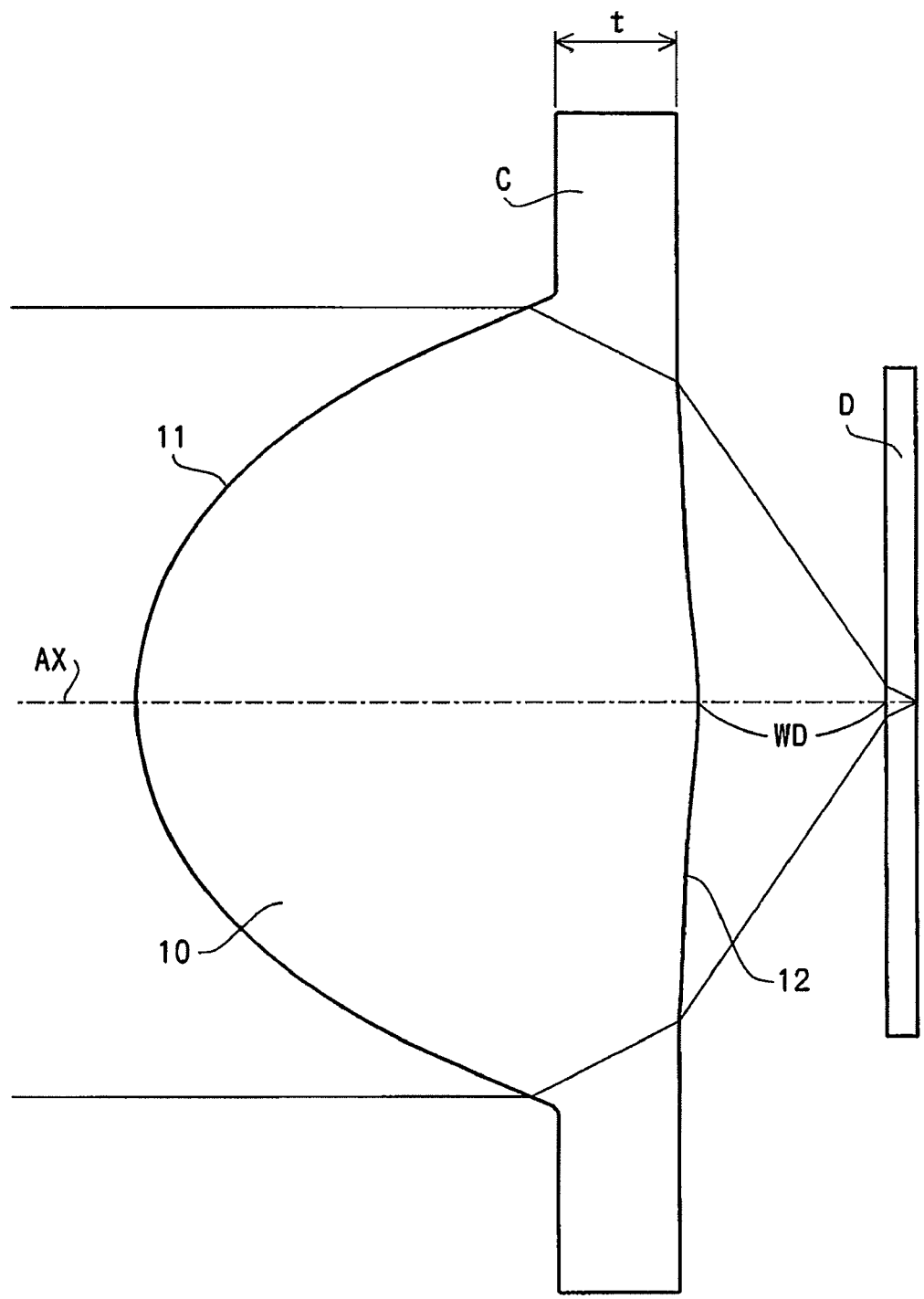
FIG. 12 is an enlarged cross section of a configuration around an objective lens according to a sixth example.

FIG. 12 is an enlarged cross section of the configuration around the objective lens 10 according to a sixth example. Concrete specifications of the objective lens 10 according to the sixth example, i.e., the wavelength λ (unit: nm) of the light beam used for information recording and information reproducing for the optical disc D, the focal length f (unit: mm) of the objective lens 10 defined when the optical disc D is used and NA, are indicated below.

| λ: | 405 |
|---|---|
| f: | 1.45 |
| NA: | 0.85 |

Table 11 shows a specific numerical configuration of the optical information recording/reproducing apparatus 100 according to the sixth example defined when the optical disc D is used.

TABLE 11

| Surface No. | R | d | n |
|---|---|---|---|
| 1 | 0.949 | 1.580 | 1.560 |
| 2 | −2.269 | 0.529 | |
| 3 | ∞ | 0.087 | 1.622 |
| 4 | ∞ | | |

In Table 11, the surface numbers #1 and #2 represent the first surface 11 and the second surface 12, respectively, and the surface numbers #3 and #4 represent the protective layer and the record surface of the optical disc D, respectively.

Each of the first surface 11 (surface #1) and the second surface 12 (surface #2) of the objective lens 10 is an aspherical surface. The following Table 12 shows the conical coefficients κ and aspherical coefficients $A_4$, $A_6$ . . . of each aspherical surface.

TABLE 12

| | Surface #1 | Surface #2 |
|---|---|---|
| κ | −0.670 | 0.000 |
| A4 | 2.69300E−02 | 6.90500E−01 |
| A6 | 2.45500E−02 | −1.74800E+00 |
| A8 | −7.80000E−02 | 3.42900E+00 |
| A10 | 3.20900E−01 | −4.24000E+00 |
| A12 | −7.10460E−01 | 2.61610E+00 |
| A14 | 9.49670E−01 | 3.25290E−02 |
| A16 | −7.56080E−01 | −1.14020E+00 |
| A18 | 3.32360E−01 | 6.72040E−01 |
| A20 | −6.20470E−02 | −1.30920E−01 |

As described above, the focal length f, the refractive index n and the wavelength λ of the sixth example satisfy the conditions (1), (6) and (7). Based on the numeric values in the sixth example, "d·n/f", "(SAG1)'$_{MAX}$·n", "(f−d)/WD" and "r·n/f" are obtained as 1.700, 3.620, −0.246, 1.021, respectively. That is, all of the conditions (1) to (7) are satisfied in the sixth example. Therefore, according to the sixth example, it is possible to provide a resin objective lens suitable for information recording and information reproducing for the high recording density optical disc. That is, the resin objective lens configured to effectively suppress increase of the lens thickness and the focal length while securing the adequate peripheral part thickness can be provided.

Figure 13A:
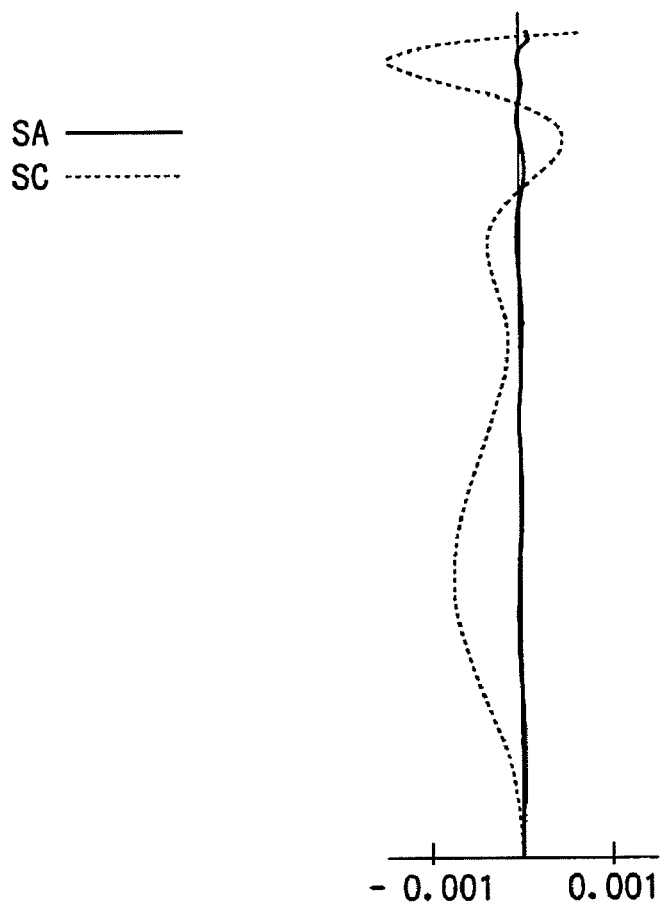
FIG. 13A is a graph illustrating the spherical aberration and the offense of the since condition caused when the high recording density optical disc is used in the optical information recording/reproducing apparatus according to the sixth example.
Figure 13B:
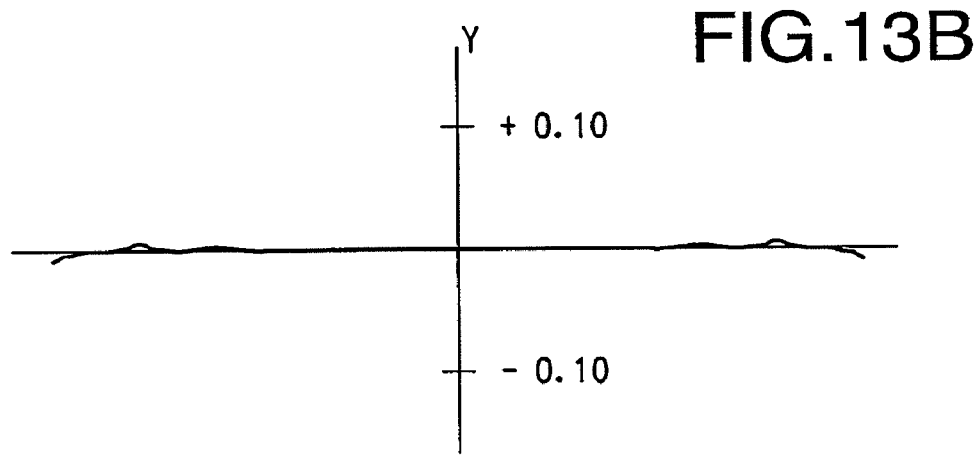
FIG. 13B is a graph illustrating the wavefront aberration caused when the high recording density optical disc is used in the optical information recording/reproducing apparatus according to the sixth example.

FIG. 13A is a graph illustrating the spherical aberration SA and the offense against the since condition SC caused when the optical disc D is used in the optical information recording/reproducing apparatus 100 according to the sixth example. FIG. 13B is a graph illustrating the wavefront aberration caused when the optical disc D is used in the optical information recording/reproducing apparatus 100 according to the sixth example.

As can be seen from FIG. 13A, the spherical aberration caused when the optical disc D is used is suitably corrected. It is also understood that the offense against the sine condition is also suitably suppressed, and the coma is suitably corrected.

As can be seen from FIG. 13B, the degree of wavefront undulation is small. Therefore, it becomes possible to form a minute beam spot on the record surface of the optical disc D. As described above, according to the objective lens 10 of the sixth example, the aberrations are suitable corrected while achieving the NA required for information recording and information reproducing for the optical disc D. Consequently, it becomes possible to ensure performing information recording and information reproducing with high degree of precision for the optical disc D.

COMPARATIVE EXAMPLE

Figure 14:
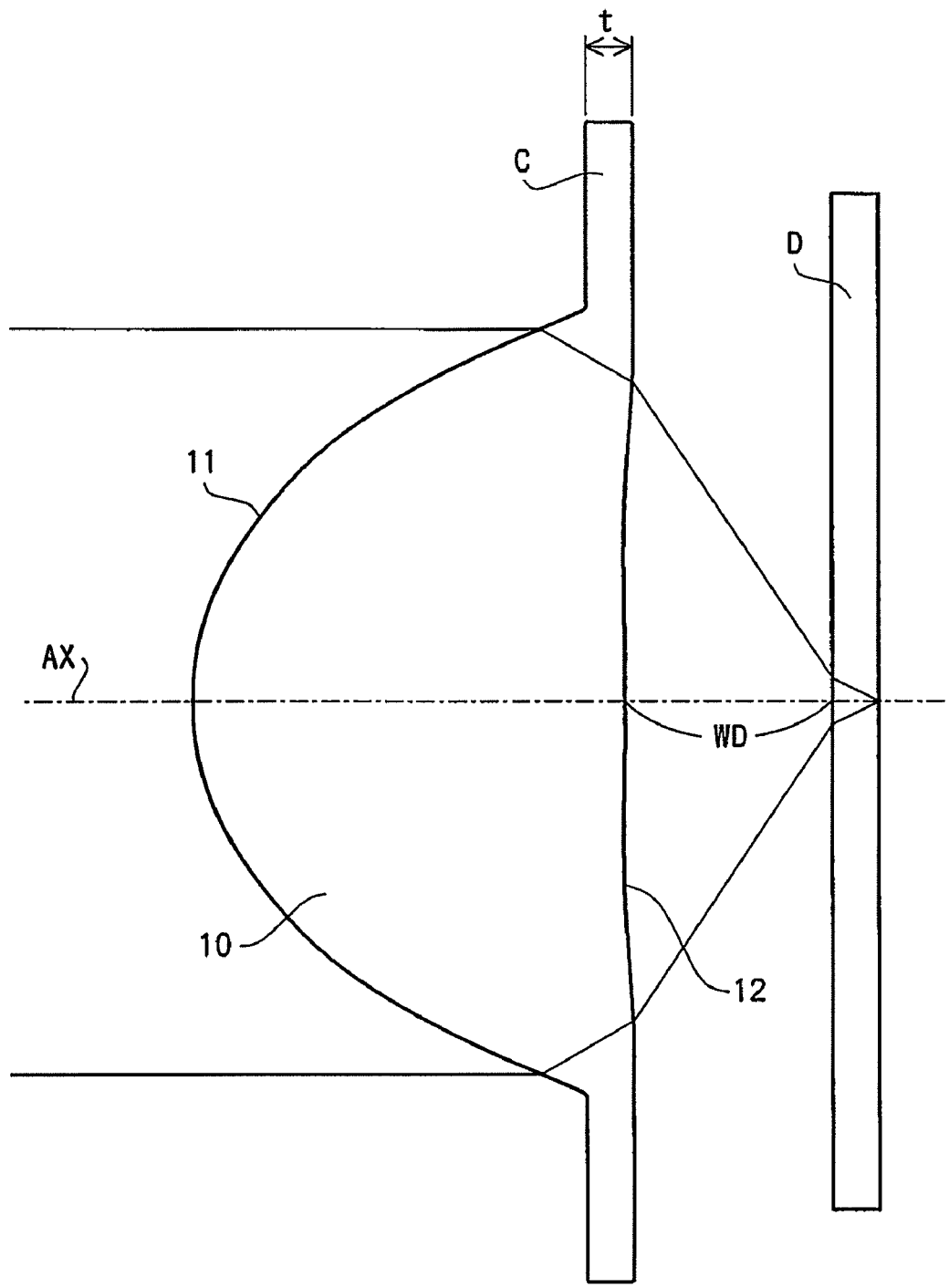
FIG. 14 is an enlarged cross section of a configuration around an objective lens according to a comparative example.

FIG. 14 is an enlarged cross section of the configuration around the objective lens 10 according to a comparative example. Concrete specifications of the objective lens 10 according to the comparative example, i.e., the wavelength λ (unit: nm) of the light beam used for information recording and information reproducing for the optical disc D, the focal length f (unit: mm) of the objective lens 10 defined when the optical disc D is used and NA, are indicated below.

| λ: | 405 |
|---|---|
| f: | 0.90 |
| NA: | 0.85 |

Table 13 shows a specific numerical configuration of the optical information recording/reproducing apparatus 100 according to the comparative example defined when the optical disc D is used.

TABLE 13

| Surface No. | R | d | n |
|---|---|---|---|
| 1 | 0.623 | 0.810 | 1.651 |
| 2 | −4.793 | 0.385 | |
| 3 | ∞ | 0.087 | 1.622 |
| 4 | ∞ | | |

In Table 13, the surface numbers #1 and #2 represent the first surface 11 and the second surface 12, respectively, and the surface numbers #3 and #4 represent the protective layer and the record surface of the optical disc D, respectively.

Each of the first surface 11 (surface #1) and the second surface 12 (surface #2) of the objective lens 10 is an aspherical surface. The following Table 14 shows the conical coefficients κ and aspherical coefficients $A_4$, $A_6$ . . . of each aspherical surface.

TABLE 14

|  | Surface #1 | Surface #2 |
|---|---|---|
| κ | −0.62 | 0.000 |
| A4 | 8.36700E−02 | 8.20800E−01 |
| A6 | 2.21100E−01 | −1.38900E+00 |
| A8 | −1.08900E+00 | −8.42200E−01 |
| A10 | 7.72400E+00 | 4.85500E+00 |
| A12 | −2.37760E+01 | −3.30980E+00 |
| A14 | 3.91480E+01 | −3.70310E+00 |
| A16 | −2.65270E+01 | 3.97870E+00 |

As described above, the comparative examples is configured not to satisfy the condition (1) regarding the focal length f although the conditions (6) and (7) regarding the refractive index n and the use wavelength λ are satisfied. Based on the numeric values in the comparative example, "d·n/f", "(SAG1)'$_{MAX}$·n", "(f−d)/WD" and "r·n/f" are obtained as 1.486, 3.632, 0.234, 1.143, respectively. Therefore, the comparative example does not satisfy the conditions (1), (2) and (4) although the conditions (3) and (5) to (7) are satisfied.

Figure 15A:
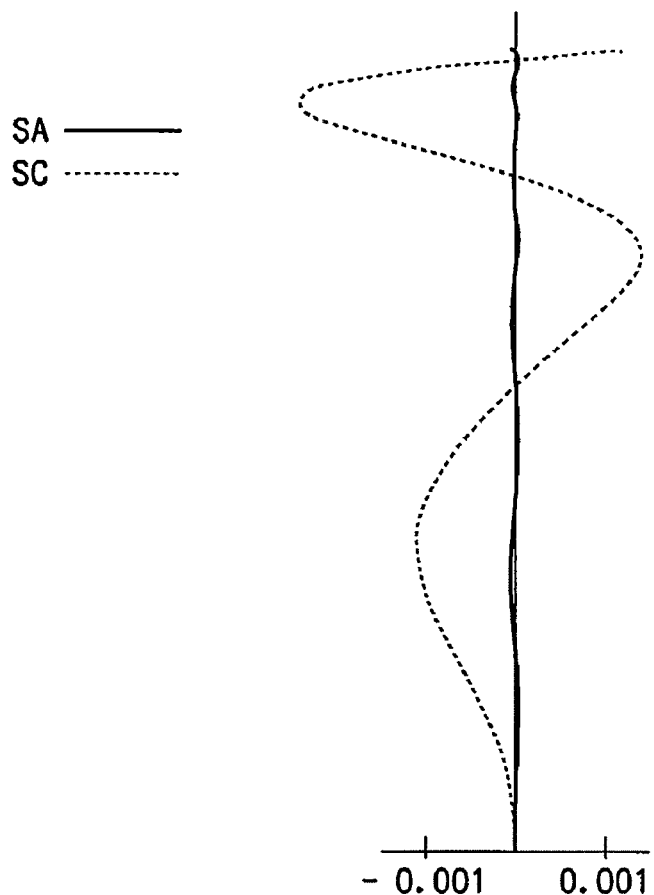
FIG. 15A is a graph illustrating the spherical aberration and the offense of the since condition caused when the high recording density optical disc is used in the optical information recording/reproducing apparatus according to the comparative example.
Figure 15B:
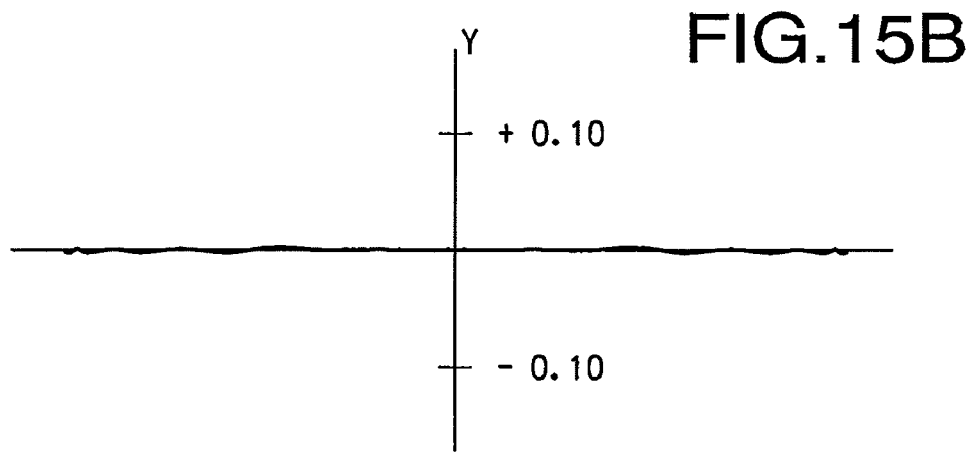
FIG. 15B is a graph illustrating the wavefront aberration caused when the high recording density optical disc is used in the optical information recording/reproducing apparatus according to the comparative example.

FIG. 15A is a graph illustrating the spherical aberration SA and the offense against the since condition SC caused when the optical disc D is used in the optical information recording/reproducing apparatus 100 according to the comparative example. FIG. 15B is a graph illustrating the wavefront aberration caused when the optical disc D is used in the optical information recording/reproducing apparatus 100 according to the comparative example.

As can be seen from FIGS. 15A and 15B, as in the cases of the first to sixth examples, the comparative example is configured to suitably correct the aberrations while achieving the NA required for information recording and information reproducing for the optical disc D, and thereby to ensure performing the information recording and information reproducing with a high degree of precision for the optical disc D. However, since the comparative example does not satisfy the conditions (1), (2) and (4), the comparative example has the following drawbacks.

The focal length f of the comparative example is lower than the lower limit of the condition (1). Therefore, as shown in Table 13, the comparative example is not able to secure the adequate working distance in comparison with the first to sixth examples.

The "d·n/f" of the comparative example is lower than the lower limit of the condition (2). Therefore, as shown in Table 13, the comparative example is not able to secure the adequate peripheral part thickness t in comparison with the first to sixth examples because the lens thickness d becomes too small (see FIG. 14).

The "(f−d)/WD" of the comparative example is larger than the upper limit of the condition (4). Due to this drawback of not satisfying the condition (4), in addition to the above describe drawback, the comparative example is not able to secure the adequate working distance in comparison with the first to sixth examples.

In another point of view, because the "(f−d)/WD" is larger than the upper limit of the condition (4), the lens thickness t becomes smaller with respect to the focal length f. as a result, it becomes impossible to secure the adequate peripheral part thickness t. Therefore, the peripheral part of the objective lens according to the comparative example is easily lost.

In addition, when the objective lens according to the comparative example is manufactured, it is necessary to control the molding pressure with a high degree of accuracy so that resin can be suitably poured to a cavity. If such control of the molding pressure with a high degree of accuracy is not achieved, a possibility that an adequate shape of the peripheral part of the lens can not be obtained arises.

As described above, since each of the first to sixth examples satisfy the conditions (1) to (7), it is possible to effectively suppress increase of the lens thickness and the focal length while securing the adequate peripheral part thickness, and thereby to provide the resin objective lens suitable for information recording and information reproducing for the high recording density objective lens.

Although the present invention has been described in considerable detail with reference to certain preferred embodiments thereof, other embodiments are possible.

This application claims priority of Japanese Patent Application No. P2008-190821, filed on Jul. 24, 2008. The entire subject matter of the application is incorporated herein by reference.

What is claimed is:

1. An objective lens used for an optical information recording/reproducing apparatus for recording information to and/or reproducing information from an optical disc based on a predetermined standard, wherein:
the objective lens is made of resin and has a numerical aperture larger than or equal to 0.75;
when f (unit: mm) represents a focal length of the objective lens with respect to a wavelength λ (unit: nm) used for recording information to and/or reproducing information from the optical disc, d (unit: mm) represents a thickness of the objective lens along an optical axis of the objective lens, and n represents a refractive index of the objective lens with respect to the wavelength λ, the objective lens satisfies following conditions (1) and (2):

$$1.00 < f < 1.50 \quad (1),$$

$$1.55 < d \cdot n/f < 1.82 \quad (2);$$

at least a light source side surface of the objective lens is an aspherical surface;
when h (unit: mm) represents a height from the optical axis, r (unit: mm) represents a curvature radius of the aspherical surface on the optical axis, κ represents a conical coefficient, and $A_4$, $A_6$, . . . represent aspherical coefficients larger than or equal to a fourth order, a sag amount SAG which is a distance between a point on the aspherical surface at a height of h from the optical axis and a plane tangential to the aspherical surface at the optical axis is represented by a following equation:

$$SAG = \frac{\frac{h^2}{r}}{1 + \sqrt{1 - (1+\kappa)\left(\frac{h}{r}\right)^2}} + A_4 h^4 + A_6 h^6 + A_8 h^8 + \ldots ;$$

a gradient (SAG)' of the aspherical surface is represented by a following equation:

$$(SAG)' = \frac{d(SAG)}{dh};$$

and
the objective lens satisfies a following condition (3):

$$2.80 < (SAG1)'_{MAX} \cdot n < 4.10 \quad (3),$$

where $(SAG1)'_{MAX}$ represents a maximum gradient of the gradient (SAG1)' of the aspherical surface at the light source side within an effective beam diameter.

2. The objective lens according to claim 1, wherein when WD (unit: mm) represents a working distance between a vertex of a optical disc side surface of the objective lens and the optical disc, the objective lens satisfies a following condition (4):

$$-0.35 < (f-d)/WD < 0.22 \quad (4).$$

3. The objective lens according to claim 1, wherein the objective lens satisfies a following condition (5):

$$0.95 < r \cdot n/f < 1.25 \quad (5).$$

4. The objective lens according to claim 1, wherein the objective lens satisfies a following condition (6):

$$1.50 < n < 1.70 \quad (6).$$

5. The objective lens according to claim 1, wherein the objective lens satisfies a following condition (7):

$$380 < \lambda < 420 \quad (7).$$

6. An optical information recording/reproducing apparatus for recording information to and/or reproducing information from an optical disc based on a predetermined standard by using a light beam having a wavelength of λ, comprising:
a light source that emits the light beam having the wavelength of λ; and
an objective lens,
wherein:
the objective lens is made of resin and has a numerical aperture larger than or equal to 0.75;
when f (unit: mm) represents a focal length of the objective lens with respect to a wavelength λ (unit: nm) used for recording information to and/or reproducing information from the optical disc, d (unit: mm) represents a thickness of the objective lens along an optical axis of the objective lens, and n represents a refractive index of the objective lens with respect to the wavelength λ, the objective lens satisfies following conditions (1) and (2):

$$1.00 < f < 1.50 \quad (1)$$

$$1.55 < d \cdot n/f < 1.82 \quad (2);$$

at least a light source side surface of the objective lens is an aspherical surface;
when h (unit: mm) represents a height from the optical axis, r (unit: mm) represents a curvature radius of the aspherical surface on the optical axis, κ represents a conical coefficient, and $A_4, A_6, \ldots$ represent aspherical coefficients larger than or equal to a fourth order, a sag amount SAG which is a distance between a point on the aspherical surface at a height of h from the optical axis and a plane tangential to the aspherical surface at the optical axis is represented by a following equation:

$$SAG = \frac{\frac{h^2}{r}}{1 + \sqrt{1 - (1+\kappa)\left(\frac{h}{r}\right)^2}} + A_4 h^4 + A_6 h^6 + A_8 h^8 + \ldots ;$$

a gradient (SAG)' of the aspherical surface is represented by a following equation:

$$(SAG)' = d(SAG)/dh;$$

and
the objective lens satisfies a following condition (3):

$$2.80 < (SAG1)'_{MAX} \cdot n < 4.10 \quad (3),$$

where $(SAG)'_{MAX}$ represents a maximum gradient of the gradient (SAG1)' of the aspherical surface at the light source side within an effective beam diameter.

7. The optical information recording/reproducing apparatus according to claim 6,
wherein when WD (unit: mm) represents a working distance between a vertex of a optical disc side surface of the objective lens and the optical disc, the objective lens satisfies a following condition (4):

$$-0.35 < (f-d)/WD < 0.22 \quad (4).$$

8. The optical information recording/reproducing apparatus according to claim 6, wherein the objective lens satisfies a following condition (5):

$$0.95 < r \cdot n/f < 1.25 \quad (5).$$

9. The optical information recording/reproducing apparatus according to claim 6, wherein the objective lens satisfies a following condition (6):

$$1.50 < n < 1.70 \quad (6).$$

10. The optical information recording/reproducing apparatus according to claim 6, wherein the objective lens satisfies a following condition (7):

$$380 < \lambda < 420 \quad (7).$$

* * * * *